US010430243B2

(12) United States Patent
Harris

(10) Patent No.: US 10,430,243 B2
(45) Date of Patent: Oct. 1, 2019

(54) FINE-GRAINED SCHEDULING OF WORK IN RUNTIME SYSTEMS

(71) Applicant: Oracle International Corporation, Redwood City, CA (US)

(72) Inventor: Timothy L. Harris, Cambridge (GB)

(73) Assignee: Oracle International Corporation, Redwood City, CA (US)

(*) Notice: Subject to any disclaimer, the term of this patent is extended or adjusted under 35 U.S.C. 154(b) by 0 days.

(21) Appl. No.: 15/887,793

(22) Filed: Feb. 2, 2018

(65) Prior Publication Data

US 2018/0181441 A1    Jun. 28, 2018

Related U.S. Application Data

(63) Continuation of application No. 15/012,496, filed on Feb. 1, 2016, now Pat. No. 9,886,317.

(60) Provisional application No. 62/111,078, filed on Feb. 2, 2015.

(51) Int. Cl.
G06F 9/50    (2006.01)
(52) U.S. Cl.
CPC .... G06F 9/5027 (2013.01); *G06F 2209/5018* (2013.01)
(58) Field of Classification Search
CPC combination set(s) only.
See application file for complete search history.

(56) References Cited

U.S. PATENT DOCUMENTS

| 9,886,317 | B2 | 2/2018 | Harris | |
|---|---|---|---|---|
| 2005/0027941 | A1* | 2/2005 | Wang | G06F 9/383 711/121 |
| 2006/0064692 | A1* | 3/2006 | Sanchez | G06F 9/4843 718/100 |
| 2007/0022422 | A1* | 1/2007 | Tirumalai | G06F 8/4442 718/100 |
| 2007/0130568 | A1 | 6/2007 | Jung et al. | |

(Continued)

OTHER PUBLICATIONS

Matteo Frigo, et al., "The implementation of the Cilk-5 Multithreaded Language", In Proceedings of the 1998 conference on Programming Language Design and Implementation (PLDI '98), Jun. 1998, pp. 212-223.

(Continued)

*Primary Examiner* — Dong U Kim
(74) *Attorney, Agent, or Firm* — Robert C. Kowert; Meyertons, Hood, Kivlin, Kowert & Goetzel

(57) ABSTRACT

A runtime system for distributing work between multiple threads in multi-socket shared memory machines that may support fine-grained scheduling of parallel loops. The runtime system may implement a request combining technique in which a representative thread requests work on behalf of other threads. The request combining technique may be asynchronous; a thread may execute work while waiting to obtain additional work via the request combining technique. Loops can be nested within one another, and the runtime system may provide control over the way in which hardware contexts are allocated to the loops at the different levels. An "inside out" approach may be used for nested loops in which a loop indicates how many levels are nested inside it, rather than a conventional "outside in" approach to nesting.

20 Claims, 26 Drawing Sheets

(56) References Cited

U.S. PATENT DOCUMENTS

| | | | |
|---|---|---|---|
| 2007/0271565 A1* | 11/2007 | Tirumalai | G06F 9/4843 |
| | | | 718/100 |
| 2009/0125548 A1 | 5/2009 | Moir et al. | |
| 2010/0269102 A1* | 10/2010 | Latorre | G06F 9/3842 |
| | | | 717/130 |
| 2010/0281471 A1 | 11/2010 | Liao et al. | |
| 2011/0067014 A1 | 3/2011 | Song et al. | |
| 2012/0089812 A1 | 4/2012 | Smith | |
| 2012/0246654 A1* | 9/2012 | Eichenberger | G06F 9/5066 |
| | | | 718/102 |
| 2012/0254888 A1* | 10/2012 | Kalogeropulos | G06F 8/452 |
| | | | 718/107 |
| 2013/0298133 A1* | 11/2013 | Jones | G06F 9/522 |
| | | | 718/104 |
| 2014/0130052 A1* | 5/2014 | Lin | G06F 9/38 |
| | | | 718/102 |
| 2015/0301983 A1* | 10/2015 | Vorbach | G06F 8/4441 |
| | | | 712/32 |
| 2016/0103683 A1* | 4/2016 | Ueno | G06F 8/41 |
| | | | 712/239 |
| 2016/0170813 A1 | 6/2016 | Robison | |

OTHER PUBLICATIONS

Gilberto Contreras, et al., "Characterizing and Improving the Performance of Intel Threading Building Blocks", IEEE, IEEE International Symposium on Workload Characterization (IISWC 2008), 2008, pp. 57-66.

Leonardo Dagum, et al., "OpenMP: An Indurstry-Standard API for Shared-Memory Programming", IEEE computational Science and Engineering, Jan.-Mar. 1998, pp. 46-55.

Sungpack Hong, et al., "Green-Marl: A DSL fo rEasy and Efficient Graph Analysis", In ASPLOS '12, Proceedings of the 17th Conference on Architectural Support for Programming Languages and Operating Systems, Mar. 2012, pp. 349-362.

James Reinders, "Intel Threading Building Blocks Outfitting C++ for Multi-core Processor Parallelism", O'Reily Media, Inc., 2007, pp. 1-16.

Michael Isard, et al., "Dyrad: Distributed Data-Parallel Programs from Sequential Building Blocks", ACM SIGOPS Operating Systems Review, vol. 41, No. 3, 2007, pp. 1-14.

Kamesh Madduri, et al., "A Faster Parallel Algorithm and Efficient Multithreaded Implementations for Evaluating Betweenness Centrality on Massive Datasets", In the Proceedings of the International Symposium on Parallel and Distributed Processing (IPDPS '09), 2009, pp. 1-8.

Grzegorz Malewicz, et al., "Pregel: A System for Large-Scale Graph Processing", In the Proceedings of the International Conference on Management of Data (SIGMOD '10) 2010, pp. 135-146.

Frank McSherry, et al., "Composable Incremental and Iterative Data-Parallel Computation with Naiad", Microsoft Research, MSR-TR-2012-105, 2012, pp. 1-14.

Jacob Nelson, et al., "Grappa: A Latency-Tolerant Runtime for Large-Scale Irregular Applications", Technical Report UW-CSE-14-02-01, 2014, pp. 1-12, University of Washington.

Donald Nguyen, et al., "A Lightweight Infrastructure for Graph Analytics*", In SOSP '13, In the Proceedings of the 24th Symposium on Operating System Principles, 2013, pp. 456-471.

"OpenMP Application Program Interface", Version 4.0, Jul. 2013, Retrieved from URL: http://www.openmp.org/mp-documents/OpenMP4.0.0.pdf., pp. 1-312.

"The PageRank Citation Ranking: Bringing Order to the Web", Technical Report 1999-66, Stanford InfoLab, 1999, pp. 1-17.

Nicolae Popovici, et al., "Putting Intel Threading Building Blocks to Work", ACM, Proceedings of the 1st International Workshop on Multicore Software Engineering, 2008, pp. 1-2.

* cited by examiner

Thread t1 executes sequential code. Other threads wait for work.

Thread t1 enters a loop at level 0. All threads participate in the loop.

Thread t1 enters a loop at level 1. Threads t1 and t5 participate.
Threads t6-t8 now wait for work from thread t5.

Threads t1 and t5 enter loops at level 0.
Threads t2-t4 and t6-t8 participate in the respective loops.

*Distribution during a level-0 loop led by t0 in which all threads participate, using separate request combiners on each socket.*

*Distribution during a level-0 loop led by t0 and by t5.*

|  | t1 | t2 | t3 | t4 |
|---|---|---|---|---|
| Start/request | REQ | REQ | REQ | 0 |
| End | 0 | 0 | 0 | 0 |

|  | t1 | t2 | t3 | t4 |
|---|---|---|---|---|
| Start/request | 0 | 100 | 200 | 0 |
| End | 100 | 200 | 300 | 0 |

Microbenchmark scalability (even work distribution)

(2-socket Xeon, 4 threads)

(2-socket Xeon, 16 threads)

(2-socket Xeon, 32 threads)

LEGEND:
Global ———+———
Per-socket ———×———
Per-core ———*———    Per-core combine-sync ———□———    Per-core combine-sync (spin) ———■———
Per-thread ———△———  Per-core combine-async ———○———   Per-core combine-async (spin) ———●———

Microbenchmark scalability (even work distribution)

(8-socket T5,
128 threads)

(8-socket T5,
512 threads)

(8-socket T5,
1024 threads)

*LEGEND*:
- Global ———+———
- Per-socket ———×———
- Per-core ———*———
- Per-thread ———△———
- Per-core combine-sync ———□———
- Per-core combine-async ———○———
- Per-core combine-sync (spin) ———■———
- Per-core combine-async (spin) ———●———

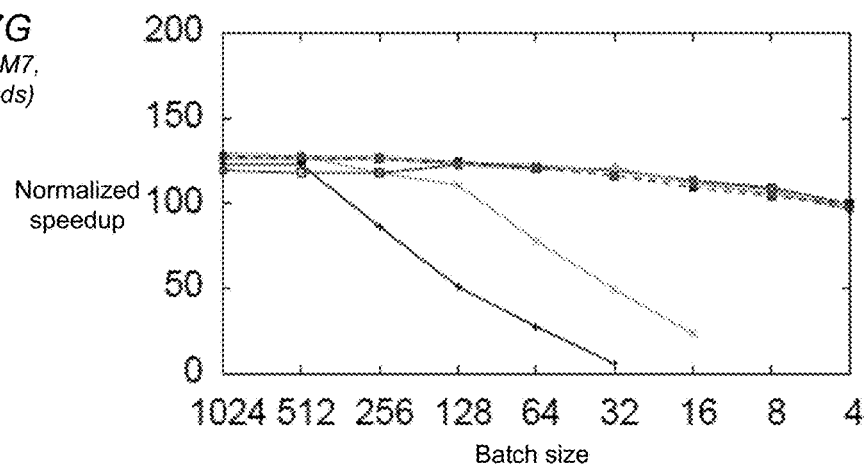
FIG. 7G (4-socket M7, 128 threads)
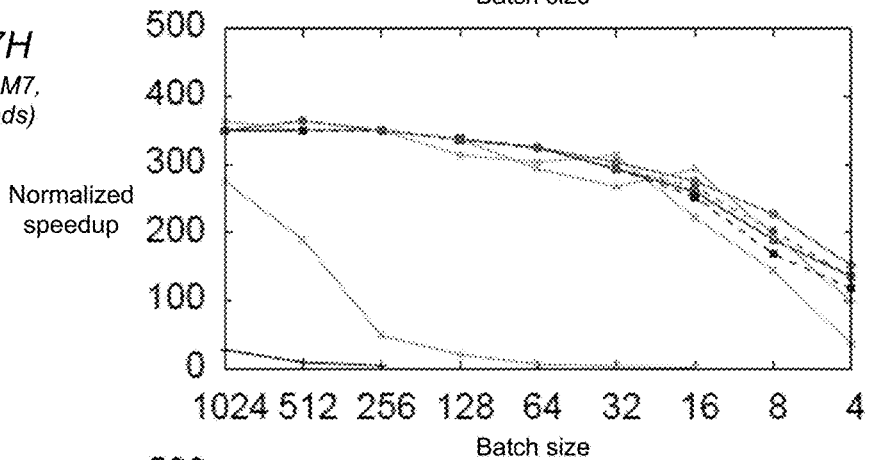
FIG. 7H (4-socket M7, 512 threads)
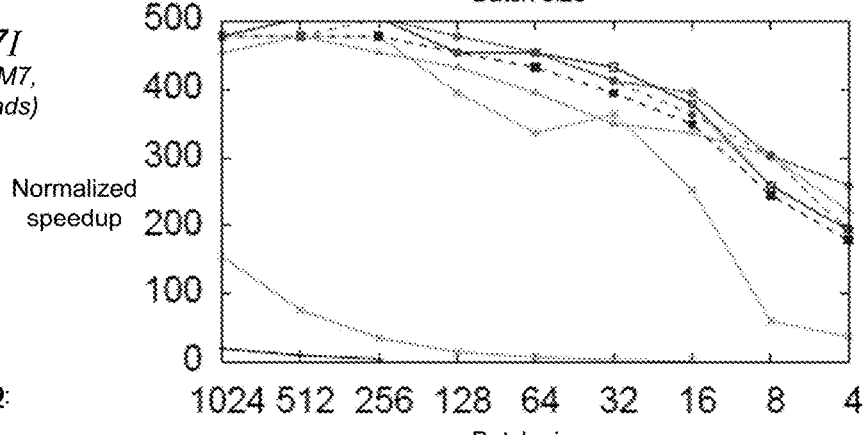
FIG. 7I (4-socket M7, 1024 threads)

Microbenchmark scalability (skewed work distribution)

(2-socket Xeon, 4 threads)

(2-socket Xeon, 16 threads)

(2-socket Xeon, 32 threads)

LEGEND:
Global ——+——
Per-socket ——×——
Per-core ——*——
Per-thread ——△——
Per-core combine-sync ——□——
Per-core combine-async ——○——
Per-core combine-sync (spin) ——■——
Per-core combine-async (spin) ——●——

Microbenchmark scalability (skewed work distribution)

(8-socket T5,
128 threads)

(8-socket T5,
512 threads)

(8-socket T5,
1024 threads)

LEGEND:
- Global
- Per-socket
- Per-core
- Per-thread
- Per-core combine-sync
- Per-core combine-async
- Per-core combine-sync (spin)
- Per-core combine-async (spin)

Microbenchmark scalability (skewed work distribution)

(4-socket M7,
128 threads)

(4-socket M7,
512 threads)

(4-socket M7,
1024 threads)

LEGEND:
Global ——+——
Per-socket ——×——
Per-core ----*----
Per-thread ----△----
Per-core combine-sync ----□----
Per-core combine-async ——○——
Per-core combine-sync (spin) ——■——
Per-core combine-async (spin) ——●——

PageRank - LiveJournal (T5-8)

(512 threads, 1024 batch size)
(The best OpenMP execution took 0.26 seconds)

T5-8,
OpenMP
(best = 1.00)

T5-8,
single global counter
(best = 1.63)

T5-8,
per-socket counters
(best = 1.11)

T5-8,
per-core counters with
async combining
(best = 0.83)

PageRank - LiveJournal (T7-4)

*(512 threads, 1024 batch size)*
*(The best OpenMP execution took 0.14 seconds)*

T7-4,
OpenMP
(best = 1.00)

T7-4,
single global counter
(best = 1.65)

T7-4,
per-socket counters
(best = 1.34)

T7-4,
per-core counters with
async combining
(best = 0.92)

Triangle counting - LiveJournal (T5-8)

*(256 threads, 256 batch size)*
*(The best OpenMP execution took 0.21 seconds)*

T5-8,
OpenMP
(best = 1.00)

T5-8,
single global counter
(best = 1.21)

T5-8,
per-socket counters
(best = 0.66)

T5-8,
per-core counters with
async combining
(best = 0.61)

Triangle counting - LiveJournal (T7-4)

*(256 threads, 64 batch size)*
*(The best OpenMP execution took 0.11 seconds)*

T7-4,
OpenMP
(best = 1.00)

T7-4,
single global counter
(best = 1.25)

T7-4,
per-socket counters
(best = 1.07)

T7-4,
per-core counters with
async combining
(best = 0.95)

PageRank - Twitter (T5-8)

(512 threads, 1024 batch size)
(The best OpenMP execution took 6.0 seconds)

T5-8,
OpenMP
(best = 1.00)

T5-8,
single global counter
(best = 1.73)

T5-8,
per-socket counters
(best = 0.94)

T5-8,
per-core counters with
async combining
(best = 0.94)

PageRank - Twitter (T7-4)

*(512 threads, 256 batch size)*
*(The best OpenMP execution took 4.2 seconds)*

T7-4,
OpenMP
(best = 1.00)

T7-4,
single global counter
(best = 1.16)

T7-4,
per-socket counters
(best = 1.04)

T7-4,
per-core counters with
async combining
(best = 1.04)

Triangle counting - Twitter (T5-8)

*(256 threads, 4 batch size)*
*(The best OpenMP execution took 55.3 seconds)*

T5-8,
OpenMP
(best = 1.00)

T5-8,
single global counter
(best = 1.16)

T5-8,
per-socket counters
(best = 1.04)

T5-8,
per-core counters with
async combining
(best = 1.04)

Triangle counting - Twitter (T7-4)

*(256 threads, 4 batch size)*
*(The best OpenMP execution took 45.3 seconds)*

T7-4,
OpenMP
(best = 1.00)

T7-4,
single global counter
(best = 1.16)

T7-4,
per-socket counters
(best = 1.04)

T7-4,
per-core counters with
async combining
(best = 1.04)

FINE-GRAINED SCHEDULING OF WORK IN RUNTIME SYSTEMS

PRIORITY INFORMATION

This application is a continuation of U.S. patent application Ser. No. 15/012,496 entitled "Fine-Grained Scheduling of Work in Runtime Systems" filed Feb. 1, 2016, which claims benefit of priority of U.S. Provisional Application Ser. No. 62/111,078 entitled "Fine-Grained Scheduling of Parallel Loops in Parallel Runtime Systems" filed Feb. 2, 2015, which are hereby incorporated by reference herein in their entirety.

BACKGROUND

Field of the Disclosure

This disclosure relates generally to parallel computing, and more particularly to systems and methods for performing fine-grained scheduling of work in runtime systems.

Description of the Related Art

Traditionally, parallelism has been exploited in high performance computing (HPC) and multi-threaded servers in which jobs are often run on dedicated machines, or on fixed sets of cores (or hardware execution contexts, also referred to as hardware contexts) in a shared machine. Traditional HPC jobs have long, stable CPU-bound phases with fixed resource requirements. Traditional servers exploit the ability to process independent requests in parallel. There is often little parallelism within each request. This style of synchronization lets traditional servers run well on current operating systems.

As parallelism is becoming more ubiquitous, there is less programmer effort put into tuning software to run on a particular parallel machine, since there are more different types of machines capable of executing parallel workloads, and the differences between them make it difficult (if not impossible) to tune applications for each one. In addition, many emerging parallel workloads exhibit CPU demands that vary over time. For example, in graph analytic jobs, the degree of parallelism can both vary over time and depend on the structure of the input graph. Other examples include cases in which parallelism is used to accelerate parts of an interactive application (occurring in bursts in response to user input). Current operating systems and runtime systems do not perform well for these types of workloads (e.g., those with variable CPU demands and frequent synchronization between parallel threads). Typical solutions attempt to avoid interference between jobs either by over provisioning machines, or by manually pinning different jobs to different cores/contexts.

Software is increasingly written to run on multi-processor machines (e.g., those with multiple single-core processors and/or those with one or more multi-core processors). In order to make good use of the underlying hardware, customers want to run multiple workloads on the same machine at the same time (i.e. on the same hardware), rather than dedicating a single machine to a respective single workload. In addition, many parallel workloads are now large enough that a single workload can individually scale to use an entire machine; malleable (meaning, for example, that workloads can run over a varying number of hardware contexts, using abstractions such as multi-processing APIs to dynamically schedule loops rather than explicitly creating threads themselves); and/or "bursty" (meaning, for example, that their CPU demand can vary within a single execution, such as with a mix of memory-intensive and/or CPU-intensive phases, and other less resource-intensive phases).

Parallel runtime systems are often based on distributing the iterations of a loop in parallel across multiple threads in a machine. One issue is how to decide which thread should execute which iterations. If this is done poorly then either (1) load imbalance may occur, with some threads left idle without work while other threads are "hoarding" work, or (2) excessive overheads may be incurred, with the cost of scheduling work outweighing the speed-ups achieved by parallelism. To address this, programmers often need to tune workloads to indicate the granularity at which work should be distributed between threads. Doing this tuning well depends on the machine being used, and on its input data. However, parallelism is increasingly used in settings where manual tuning is not possible, e.g., software may need to run across a wide range of hardware, or a wide range of different inputs.

SUMMARY

Embodiments of a runtime system for distributing work (e.g., loop iterations) among multiple threads in a shared-memory machine are described that may implement fine-grained distribution of the loop iterations, which may reduce load imbalance and thereby improve performance. In some embodiments, the mechanisms and techniques described herein for implementing fine-grained distribution of loop iterations (which may be collectively referred to herein as "the runtime system" or "RTS") may be integrated with a framework that includes a resource management layer between the runtime system and the system-wide scheduler of the operating system to coordinate multiple parallel workloads on a shared machine.

In some embodiments, the systems described herein may implement techniques for very fine-grained distribution of parallel work with low overheads. These techniques may substantially reduce, or even remove, the need for tuning the granularity of work distribution: it can be set very low without incurring costs. In some embodiments, the systems may implement a request combining technique for use in cores on a multi-threaded processor (such as an Oracle® SPARC processor or Intel® 64 processor). In some embodiments, the request combining technique may be asynchronous; that is, a thread may begin or continue to do work while waiting to obtain additional work via the request combining technique. The asynchronous request combining technique may make use of the observation that requesting a new piece of work before a thread completes its current piece of work can expose the requests to a longer interval of time during which they may be combined with requests from other threads.

In some embodiments, the runtime system described herein may be designed for multi-socket shared memory machines and may support very fine-grained scheduling of parallel loops, down to the level of single iterations of 1 K cycles. This fine-grained scheduling may help avoid load imbalance, and may avoid the need for tuning workloads to particular machines or particular inputs. In some embodiments, the runtime system may achieve this by combining per-core iteration counts to distribute work initially, and a request combining technique, for example an asynchronous request combining technique, for when threads require more work. In some embodiments, the mwait instruction in the SPARC M7 processors (or similar instructions on other processors) may be leveraged to help achieve good performance under high thread counts.

In some embodiments, parallel loops can be nested within one another, and the runtime system may provide control over the way in which hardware contexts are allocated to the loops at the different levels. The workloads targeted by these techniques may have a small number of levels of parallelism, dependent on the algorithm rather than on its input. As an example, a Betweenness Centrality workload (BC) may use a loop at an outer level to iterate over vertices, and then use loops(s) at an inner level to implement a parallel breadth-first search (BF S) from each vertex.

In some embodiments, an "inside out" approach may be used for nested loops in which a loop indicates how many levels are nested inside it, rather than a conventional "outside in" approach to nesting. Using the "inside out" approach, a loop at level 0 is an inner loop without further parallelism inside the loop. A loop at level 1 has one level of parallelism within it, and so on.

While embodiments of the runtime system are generally described in the context of scheduling work (loop iterations) for parallel loops, the techniques described herein, for example the techniques for combining requests for work, may be applicable in other contexts, for example in a context in which multiple threads obtain work from a queue of work items.

BRIEF DESCRIPTION OF THE DRAWINGS

FIGS. 7A-7I graphically illustrate performance of microbenchmark scalability experiments with even work distribution, according to some embodiments.

Figure 1:
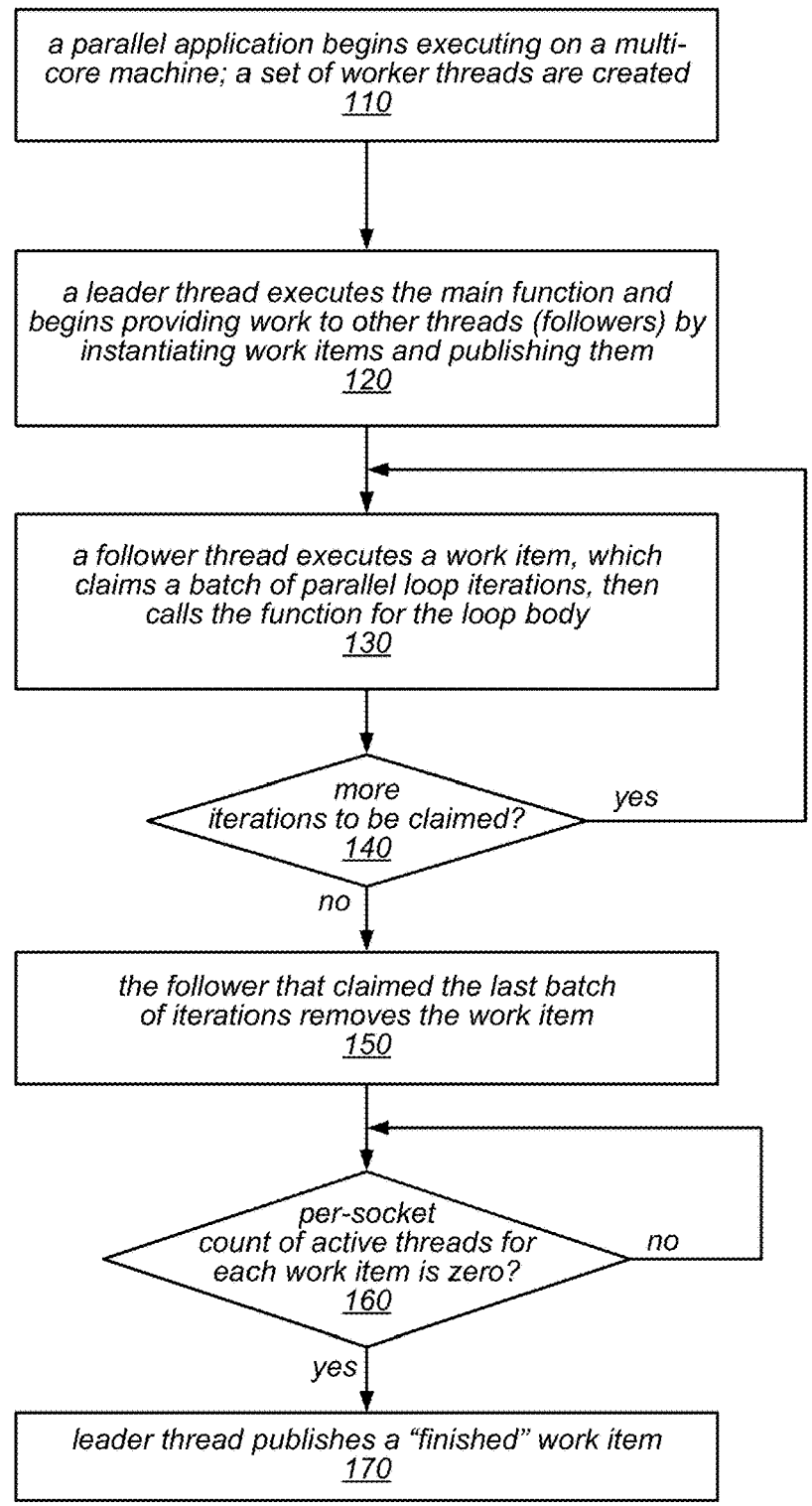
FIG. 1 is a flow diagram of a method for scheduling parallel loops, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Introduction

Software is increasingly written to run on multi-processor machines. Trends in this area include the need to make effective use of multi-core hardware (leading to increasing use of parallelism within software), the desire to use hardware efficiently (leading to greater co-location of workloads on the same machine), and the expectation that parallel applications should "just work" without needing to perform careful tuning that is directed to any specific hardware. A runtime system for distributing loop iterations between multiple threads in a shared-memory machine is described that may implement fine-grained distribution of the loop iterations, which may reduce load imbalance and thereby improve performance. In some embodiments, the mechanisms and techniques described herein for implementing fine-grained distribution of parallel loops (which may be collectively referred to herein as "the runtime system" or "RTS") may be integrated with a framework that includes a resource management layer between the runtime system and the system-wide scheduler of the operating system to coordinate multiple parallel workloads on a shared machine (which may be referred to herein as "the execution framework").

Note that for different processor architectures, different terminology may be used to describe the hardware execution resources. For example, they may be referred to as "hardware execution contexts," "hardware contexts," "hardware strands", "hardware threads", "processor cores", or simply "cores", in different cases, and multiple ones of these hardware execution resources may be included in a single processor socket. These terms may be used somewhat interchangeably in the descriptions that follow, such that techniques described herein as being applicable in systems in which the hardware execution resources are referred to using one of these terms may also be applicable in systems in which the hardware execution resources are referred to using another one of these terms, or using another term that describes the hardware execution resources of a machine that is capable of executing parallel workloads. Note also that the techniques described herein may be applied at different granularities, e.g., for scheduling complete processors, for scheduling cores within those processors (each of which may include comprising multiple hardware contexts), or for scheduling individual hardware contexts.

Current work (or loop) scheduling solutions include:

Manual setting of the distribution granularity. This is typical in programming models such as dynamic loop scheduling in the OpenMP (Open Multi-Processing) programming model.

"Guided" scheduling, in which a runtime system starts by distributing large pieces of work to threads, and then works down toward finer granularity as the overall pool of work is completed. (Hence most work is distributed with low overhead in the initial steps, but fine-grained distribution is used toward the end to smooth out the load on the threads as they near completion). This works well for workloads where iterations perform roughly constant amounts of work each. It is not effective for many graph analytics workloads in which some iterations perform vastly more work than others.

In some embodiments, the systems described herein may implement techniques for very fine-grained distribution of parallel work with low overheads. These techniques may substantially reduce, or even remove, the need for tuning the granularity of work distribution: it can be set very low without incurring costs. In some embodiments, the systems may implement a request combining technique for use in a core on a multi-threaded processor (such as an Oracle® SPARC processor). In some embodiments, the systems may implement an asynchronous request combining technique for use in a core on a multi-threaded processor (such as an Oracle® SPARC processor). In various embodiments, these techniques may make use of the observation that requesting a new piece of work before a thread completes its current piece of work can expose the requests to a longer interval of time during which they may be combined with requests from other threads. In some embodiments, the techniques described herein for combining requests may (1) increase the likelihood that the thread will have received new work before its current work runs dry, and (2) decrease the contention on the shared counter from which work is obtained. In some embodiments, the techniques described herein may benefit from the ldmonitor/mwait instructions present in SPARC M7 systems, or similar instructions in other systems. Note that the techniques described herein may be applicable to many settings where parallel loops are used, in different embodiments. In addition, the techniques for combining requests for work may be applicable in additional settings without using loops—for instance, for threads obtaining work from a queue of work items.

In some embodiments, the runtime system described herein may be designed for multi-socket shared memory machines and may support very fine-grained scheduling of parallel loops, down to the level of single iterations of 1 K cycles. This fine-grained scheduling may help avoid load imbalance, and may avoid the need for tuning workloads to particular machines or particular inputs. In some embodiments, the runtime system may achieve this by using per-core iteration counts to distribute work initially, and a request combining technique, for example an asynchronous request combining technique, for when threads require more work. In some embodiments, the mwait instruction in the SPARC M7 processors (or similar instructions on other processors) may be leveraged to help achieve good performance under high thread counts.

Results of experiments with embodiments of the runtime system using in-memory graph analytics algorithms on a 2-socket Intel® 64 machine (32 hardware contexts) and on 4-socket and 8-socket SPARC machines (each with 1024 hardware contexts) are presented below. In addition to removing the need for tuning, on the SPARC machines embodiments of the runtime system may improve absolute performance by up to 39% when compared with OpenMP. On both processor architectures, embodiments may provide improved scaling and performance when compared with a graph analytics system such as Galois.

Runtime System

Embodiments of a runtime system for multi-socket shared memory machines are described. In some embodiments, the runtime system aims to support workloads which are fast and scalable across a wide range of parallel machines. For example, this system may be well suited for the requirements of graph analytics workloads such as PageRank and Betweenness Centrality (BC). These workloads are increasingly important commercially, and are the current focus of benchmarking efforts along with myriad single-machine systems (such as Galois and Green-Marl) and distributed systems (such as Grappa, Naiad, and Pregel). Parallelism is often abundant because, for many algorithms, different graph vertices can be processed concurrently. However, it can be difficult to exploit this parallelism effectively, for example because of the difficulty of achieving good load balance in combination with low synchronization overhead. Note that there may be a lack of locality in these workloads, hence these techniques may place an emphasis on distributing work and data across the whole machine, efficient use of large pages, etc.

As a running example, consider the implementation of a single PageRank step (shown in the example code below):

```
#pragma omp for schedule(dynamic, BATCH_SIZE)
for (node_t t = 0; t <G.num_nodes( ); t ++) {
    double val = 0.0;
    for (edge_t w_idx = G.r_begin[t];
        w_idx < G.r_begin[t+1]; w_idx ++) {
        node_t w = G.r_node_idx [w_idx];
        val += G_pg_rank[w] / (G.begin[w+1] – G.begin[w]);
    }
    G_pg_rank_nxt[t] = (1 – d) / N + d * val ;
}
```

In this example, the outer loop (t) ranges over the vertices in the graph. Within each iteration, w ranges over the vertices adjacent tot and updates the new PageRank value for t based on the current value for w. Using OpenMP as an example, the pragma indicates that chunks of BATCH_SIZE iterations of the outer loop should be assigned dynamically to threads. Typically, implementations do this with an atomic fetch-and-add on a shared counter.

Setting BATCH_SIZE introduces a trade-off, and thus setting BATCH_SIZE optimally is difficult. Setting it too large risks load imbalance, with threads taking large batches of work and some threads finishing before others. Setting it too small introduces synchronization overheads. There are two main reasons why it is difficult to set the size optimally: First, the distribution of work between iterations is uneven. As an analogy, in a social network a celebrity may have millions of times more neighbors than the average. Even if the iterations are divided evenly between the threads, the work performed is uneven. Second, the optimal size depends on the machine and the input data set. This is made more complex by the increasing diversity of hardware, and the fact that machines are increasingly shared or virtualized.

As described in more detail below, embodiments of the runtime system may reduce the need for tuning by making it efficient to select a very small BATCH_SIZE while still achieving good performance and scalability. Concretely, on machines with 1024 hardware contexts, embodiments may achieve good performance down to batches of around 1 K cycles (compared with 200K cycles using dynamically scheduled OpenMP loops).

The programming model supported by the runtime system is described below, according to at least some embodiments. For example, the model may provide nested parallel loops, with control over how the hardware contexts in the machine are allocated to different levels of the loop hierarchy. For instance, an outer loop may run with one thread per core, leaving additional threads per core idle until an inner level of parallelism is reached. This non-work-conserving approach to nesting in which some threads may remain idle until needed at an inner level of parallelism, when compared to conventional work-conserving approaches such as work-stealing queue techniques in which idle threads may steal work queued for other threads, can lead to better cache performance when iterations of the inner loop share state in a per-core cache.

Techniques used to enable fine-grained work distribution are described in more detail below, according to at least some embodiments. For example, a series of primitive mechanisms may be provided which can be composed to express more complex policies appropriate for a given machine. In some embodiments, distributed per-thread/core/socket counters may avoid threads synchronizing on a single shared loop counter. In some embodiments, a request combining mechanism may allow threads requesting new work to aggregate their requests before accessing a shared counter (e.g., combining requests via local synchronization in a core's L1 cache, to reduce contention on a shared L2 cache). In some embodiments, an asynchronous request combining technique may be implemented in which a thread issues a request for new work concurrently with executing its current work. The asynchronous request combining technique provides a longer time interval during which combining can occur. Furthermore, in some embodiments, request combining can be achieved with ordinary read/write operations, reducing the need for atomic read-modify-writes.

Various evaluations of the performance of embodiments of the runtime system are described later in this document. These evaluations used a 2-socket Intel® 64 system (having 32 hardware contexts). The evaluations also used Oracle® SPARC T5-8 machines and T7-4 machines using Oracle® SPARC M7 processors (each with 1024 hardware contexts). These machines provide a range of hardware primitives, e.g., the Intel® 64 systems support atomic fetch-and-add, while the T7 system supports a user-accessible mwait primitive for a thread to wait for an update to a cache line. The performance of the different work distribution techniques described herein is illustrated using a microbenchmark with fixed size CPU-bound loops. The performance of these techniques is further illustrated for various graph analytics algorithms on memory-resident data. In addition to comparing with OpenMP, PageRank results are also compared with Galois, a system for graph analytics based on scalable work-stealing techniques. In contrast to work-stealing, results show that the shared-counter representation used in embodiments for parallel work enables single-thread performance improvements of 5%-26%. The asynchronous combining technique enables improved scalability on both processor architectures.

When compared to task-parallel models such as Intel® Cilk™ and Intel® Threading Building Blocks (TBB), embodiments of the runtime system described herein differ from these systems in several ways. For example, compared with thread-local work queues and work-stealing as used in these task-parallel models, embodiments of the runtime system described herein distribute batches of loop iterations via shared counters. Request aggregation is used to reduce contention on these counters rather than using thread-local work queues. This approach avoids reifying individual batches of loop iterations as entries in work queues. As another example, embodiments of the runtime system may exploit the structure of the machine in the programming model as well as the runtime system. At least some embodiments may implement a non-work-conserving approach to nesting that contrasts with work-stealing implementations of task-parallelism in which all of the idle threads in a core would start additional iterations of the outer loop. In workloads with nested parallelism, the non-work-conserving approach may reduce cache pressure when different iterations of an outer loop have their own iteration-local state: it may be better to have multiple threads sharing this local state, rather than extracting further parallelism from the outer loop.

Parallel Loops

An example API that may be supported by embodiments of the runtime system is described below, according to at least some embodiments. For example, initial workloads include graph analytics algorithms generated by a compiler from the Green-Marl DSL. While it is hoped that the syntax is reasonably clear, the main goal is performance.

Flat Parallelism

As described in detail herein, embodiments of the runtime system are based on parallel loops. The programmer must ensure that iterations are safe to run concurrently. Loops may, for example, be expressed using C++ templates, specializing a parallel_for function according to the type of the iteration variable, the loop bounds, and the loop body.

In some embodiments, the loops may distribute their iterations across the entire machine. This reflects the fact that graph algorithms typically have little temporal or spatial locality in their access patterns. In this setting, a concern is to reduce contention in the runtime system and achieve good utilization of the hardware contexts across the machine and their associated memory.

For example, a parallel loop to sum the numbers 0 . . . 10 may be written:

```
struct example_1 {
    atomic<int> total {0}; // 0-initialized atomic
    void work(int idx) {
        total += idx; // Atomic add
} } e1;
parallel_for<example_1, int>(e1 0, 10);
cout << e1.total;
```

The work function provides the body of the loop. The parallel for is responsible for distributing work across multiple threads. The struct e1 is shared across the threads. Hence, due to the parallelism, atomic add operations are needed for each increment.

In some embodiments, per-thread state can be used to reduce the need for atomic operations. This per-thread state is initialized once in each thread that executes part of the loop, and then passed in to the work function:

```
struct per_thread { int Val; };
struct example_2 {
atomic<int> total {0}; // 0-initialized atomic
    void fork(per_thread &pt) { pt.val = 0; }
    void work(per_thread &pt, int idx) {
        pt.val += idx; // Unsynchronized add
    }
    void join(per_thread &pt) {
        total += pt.val; // Atomic add
} } e2;
parallel_for<example_2, per_thread, int>(e2,0,10);
cout << e2.total;
```

In this example, the fork function is responsible for initializing the per-thread counter. The work function then operates on this per-thread state. The join function uses a single atomic addition to combine the results.

In some embodiments, C++ closures may be used to express loop bodies. Such closures may provide simpler syntax for short examples, and permit variables from the enclosing scope to be captured by reference. For instance:
    atomic<int> total {0};
    parallel_for<int>(0, 10,
    [&](int idx){total+=idx;});

Compilers now generally provide good performance for calling closures in this kind of example. While it is possible that performance may vary somewhat in some implementations using closures, in practice embodiments may be implemented that utilize C++ closures to express loop bodies while providing good performance.

In the above examples, for simplicity, there is an implicit barrier at the end of each loop. This reflects the fact that, for the workloads, there is abundant parallel work, and implementation techniques may be used that are effective in reducing load imbalance. In implementations where the runtime system runs within an environment where it has exclusive use of hardware contexts, thread preemption is not a concern. In more variable multiprogrammed environments, dynamic techniques, abstractions and analyses, or other methods may be used to mitigate straggler problems.

The implementation of the parallel loop scheduling techniques described herein is initially presented from the point of view of a single level of parallelism. Nested parallelism is described later in this document. In some embodiments, the implementation is built over a work-sharing system.

One embodiment of a method for scheduling parallel loops using the techniques described herein is illustrated by the flow diagram in FIG. 1. As indicated at 110, a parallel application begins executing on a multi-core machine. A set of worker threads is created at startup. As indicated at 120, a designated leader thread proceeds with the main function and begins providing work to other threads (followers) by instantiating work items and publishing them. The follower threads wait for work to be provided by the leader thread. In some embodiments, the definition of parallel_for instantiates a work item object and publishes it via a shared pointer being watched by the followers.

As indicated at 130, a follower thread obtains and executes a work item. In some embodiments, the work item provides a single run method containing a loop which claims a batch of iterations before calling the workload-specific function for the loop body. This repeats until there are no more iterations to be claimed, as indicated at 140. A reference to the loop's global state (if any) is held in the work item object. If a loop has per-thread state then this is stack-allocated within the run method. Consequently, only threads that participate in the loop will need to allocate per-thread state.

As indicated at 150, the thread which claims the last batch of iterations removes the work item from the shared pointer (preventing any additional threads needlessly starting executing it). Finally, each work item holds per-socket counts of the number of active threads currently executing the item. As indicated at 160, the main thread waits for these counters to all be 0, at which point it knows that all of the iterations have finished execution. As indicated at 170, process termination may be signally by the leader thread publishing a designated "finished" work item.

With this approach, a worker thread can watch the single shared location both for new work and for termination. In some embodiments, waiting on a single location lets the mwait instruction be used on SPARC M7 processors, or similar instructions on other processors.

Nested Parallelism

In some embodiments, parallel loops can be nested within one another, and the runtime system may provide control over the way in which hardware contexts are allocated to the loops at the different levels. The workloads targeted by these techniques may have a small number of levels of parallelism, dependent on the algorithm rather than on its input. For instance, a Betweenness Centrality workload (BC) uses an outer level to iterate over vertices, and then an inner level to implement a parallel breadth-first search (BFS) from each vertex.

Selecting which of these levels to run in parallel may, for example, depend on the structure of the hardware being used. In the BC example, parallelizing just at the outer level can give poor performance on multi-threaded cores or machines because multiple threads' local BFS states compete for space in each per-core cache. Conversely, parallelizing just at the inner level gives poor performance when the BFS algorithm does not scale to the complete machine. In some embodiments, a better approach may be to use parallelism at both levels, exploring different vertices on different cores, and using parallel BFS within a core.

In some embodiments of the runtime system, an "inside out" approach to nested loops may be used in which a loop indicates how many levels are nested inside it, rather than a conventional "outside in" approach to nesting in which the outermost loop is a top level loop at level 0, loops nested in the level 0 loop are at level 1, loops nested in level 1 loops are at level 2, and so on. Using the "inside out" approach, a loop at level 0 is an inner loop without further parallelism inside the loop. A loop at level 1 has one level of parallelism within it, and so on. Concretely, parallel_for is shorthand for a loop at level 0, and a loop at level N may be written as:
    outer_parallel_for< . . . >(N, . . . );

Note that, in some embodiments, the system may be configured to handle error cases, e.g., a case in which there are missing levels, out-of-sequence levels, or repeated levels.

In some embodiments, the "inside out" approach to loops described above may provide composability. For example, a leaf function using parallelism will always be at level 0, irrespective of the different contexts it may be called from.

In systems in which nesting levels are numbered "outside in", or are assigned dynamically, it may not be possible to distinguish (i) reaching an outer loop which should be distributed across all hardware contexts, versus (ii) an outer loop which should just be distributed at a coarse level leaving some idle hardware contexts for use within it. A given program may have loops with different depths of nesting. For instance, a flat initialization phase may operate directly at level 0 and be distributed across all hardware contexts, while a subsequent computation may start at level 1 and just be distributed at a per-socket granularity.

In some embodiments, environment variables may be used to specify how different nesting levels map to the physical structure of the machine, e.g., that iterations at level 0 should be distributed across all hardware contexts, and that level 1 should be distributed across cores, core-pairs, sockets, or some other granularity. This flexibility may, for example, allow a program to express multiple levels of parallelism for use on large non-uniform memory access (NUMA) machines, but to execute in a simpler way on smaller systems.

Based on this configuration, threads may be organized into a tree which is used to select which threads participate in which loops. Each thread has a level in this tree, and a parent at the next non-empty level above it (aside from a designated top-level thread which forms the root of the tree). Dynamically, each thread has a status (leading or following). Initially, the root is leading and all other threads are following. A thread's leader is the closest parent with leading status (including the thread itself). A thread at level n becomes a leader if it encounters a loop at level k≤n. A follower at level n executes iterations from a loop if its leader encounters a loop at level k≤n; otherwise, it remains idle.

Figure 2A:
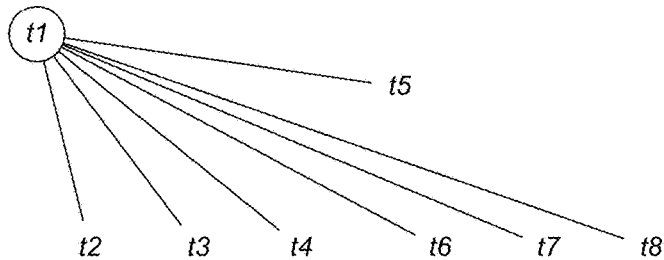
FIGS. 2A through 2D illustrate the allocation of threads to nested loops, according to some embodiments.
Figure 2B:
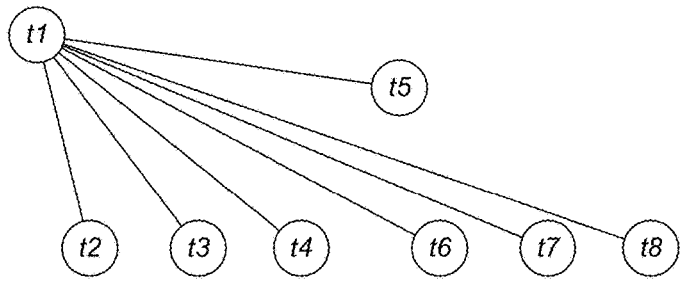
Figure 2C:
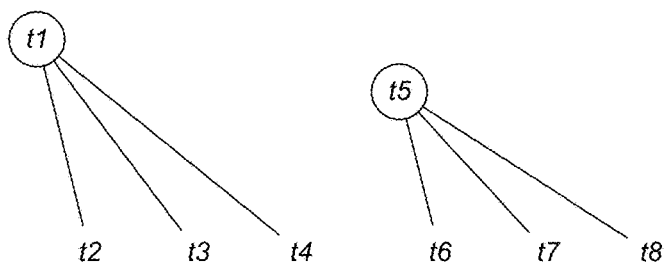
Figure 2D:
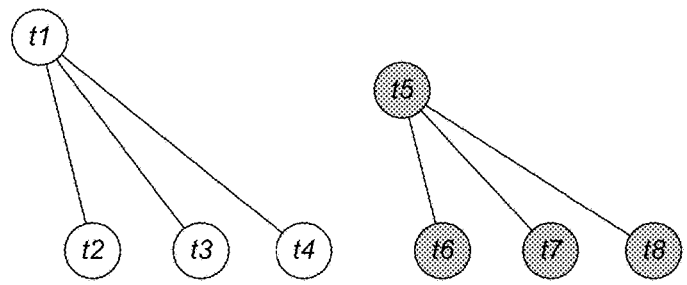

Examples of the allocation of threads to nested loops is illustrated in FIGS. 2A-2D, which show an example possible organization of eight threads t1 . . . t8 across two sockets. In this example, thread t1 operates at the top level, thread t5 at level 1, and the remaining threads at level 0. In this example, the main thread is t1 and is the parent to t2 . . . t4 in its own socket (level 0), and t5 in the second socket (level 1). In turn, t5 is parent to t6 . . . t8 at level 0. Initially t1 is the only active thread and hence leader to all of the threads t1 . . . t8 (as shown in FIG. 2A). If t1 encounters a loop at level 0 then all threads may participate in the same loop (as shown in FIG. 2B). If, instead, t1 encounters a loop at level 1 then just t1 and t5 participate (as shown in FIG. 2C). If t1 and t5 encounter loops at level 0, then t5 becomes a leader of t5 . . . t8 on the second socket, while t1 remains as leader of threads t1 . . . t4 on the first socket (as shown in FIG. 2D). In the example of FIG. 2D, each set of threads comprising a leader thread and one or more worker threads may be referred to as a team. In FIG. 2D, threads t2-t4 and t6-t8 participate in the respective loops at level 0.

Figure 2E:
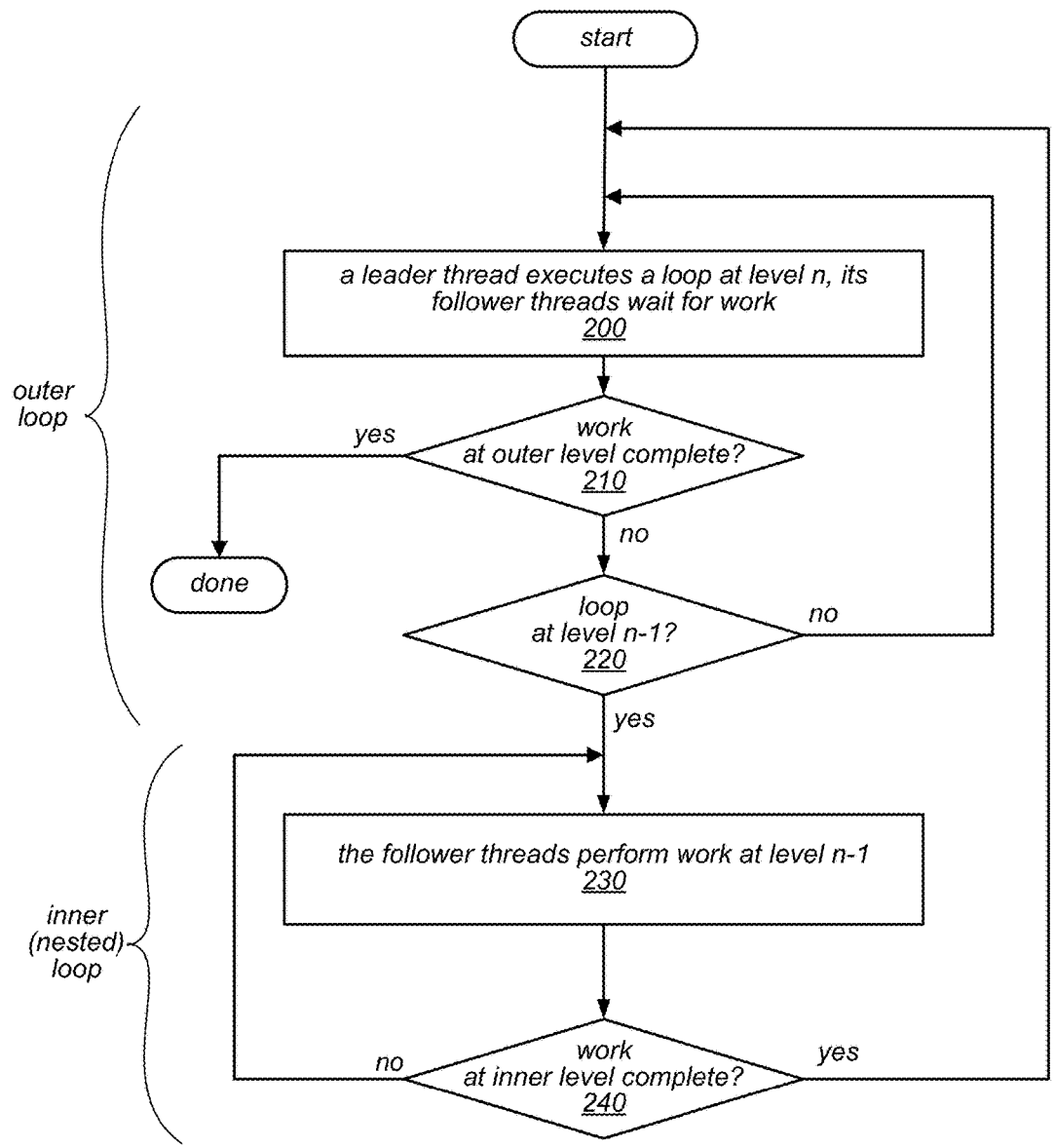
FIG. 2E is a flow diagram of an example method for allocating threads in nested loops, according to some embodiments.
Figure 4A:
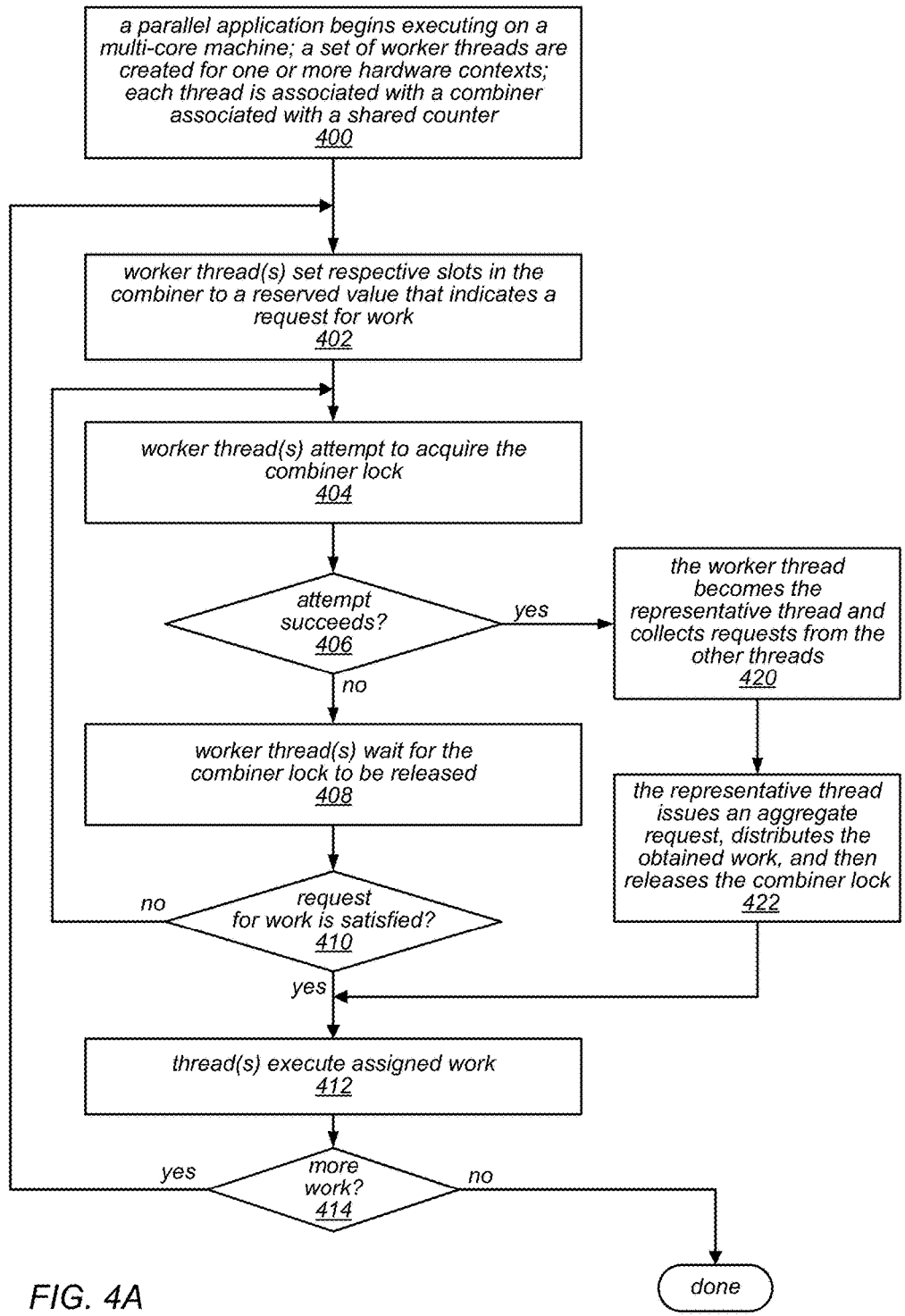
FIG. 4A is a flow diagram of a method for aggregating requests for work, according to some embodiments.
Figure 4B:
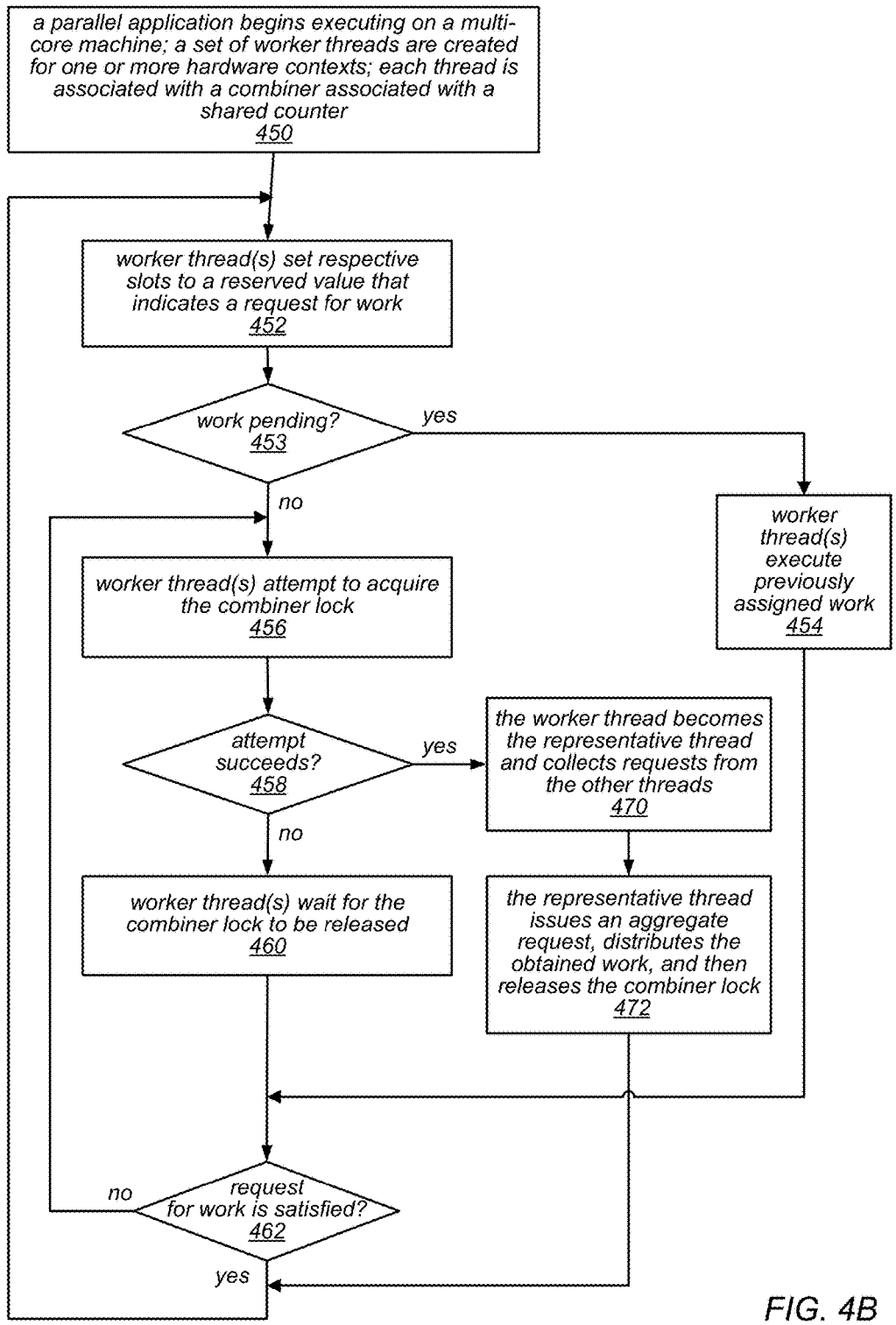
FIG. 4B is a flow diagram of an asynchronous request combining technique, according to some embodiments.

FIG. 2E is a flow diagram of a method for allocating threads in nested loops, according to some embodiments. As indicated at 200, a leader thread (e.g., thread t1 in FIG. 2C) executes a loop at level n (e.g., level 1); its follower threads (e.g., threads t2-t4 in FIG. 2C) wait for work. At 210, if work at the outer loop (e.g., level 1) is complete, then the method is done. Otherwise, as indicated at 220, the leader thread may continue to perform work in the outer loop at 210 until encountering an inner (nested) loop at 220. At 220, if the leader thread encounters an inner loop at level n−1 (e.g., at level 0), then its follower threads (e.g., threads t2-t4 in FIG. 2C) may perform work in the inner loop as indicated at 230. Note that the leader thread may, but does not necessarily, perform work in the inner loop as well. As indicated at 240, the threads may continue to request and perform assigned work at 230 (e.g., using a work scheduling method as shown in FIG. 4A or 4B) until work in the inner loop is complete; when the work in the inner loop is complete, the method returns to the outer loop at 200. Note that the outer loop illustrated in FIG. 2E may itself be nested in another loop, there may be one or more other loops nested in outer loop n at level n−1, and that there may be one or more loops nested within the inner loop (at level n−2) illustrated in FIG. 2E.

Work Scheduling

Various techniques that may be used for distributing iterations within a loop are described in detail below, according to at least some embodiments. The systems described herein may take a hierarchical approach to defining work distribution policies, with a number of basic policies that can be combined to form more complex variants. An individual thread makes a request to the leaves of a tree of work distribution objects. The implementation of this initial request may involve a call to a higher level distribution object, and so on.

In some embodiments, each possible leader thread uses a separate work distribution structure for each level at which it may start parallel work. For instance, in the example of FIGS. 2A-2D, there is one top-level structure for leader thread t1, and then two level-1 structures for leader threads t1 and t5. This reflects the maximum number of parallel loops that may be in progress concurrently.

Figure 3A:
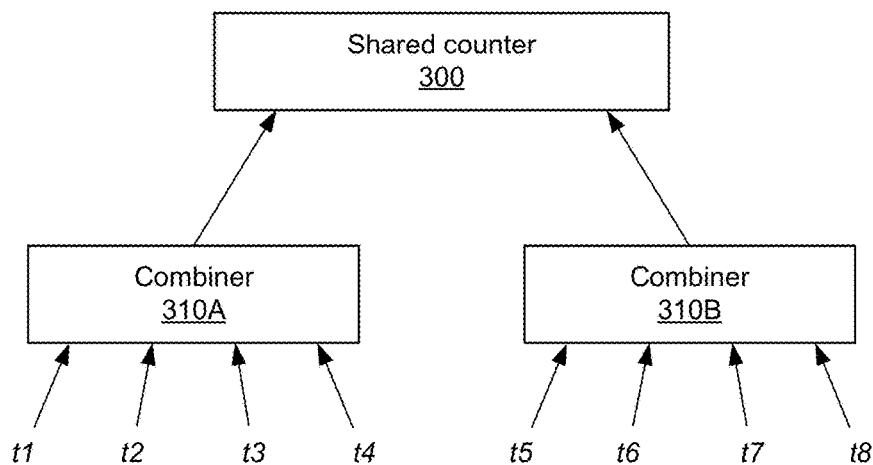
FIGS. 3A and 3B illustrate a hierarchical approach to defining work distribution policies for threads, according to some embodiments.
Figure 3B:
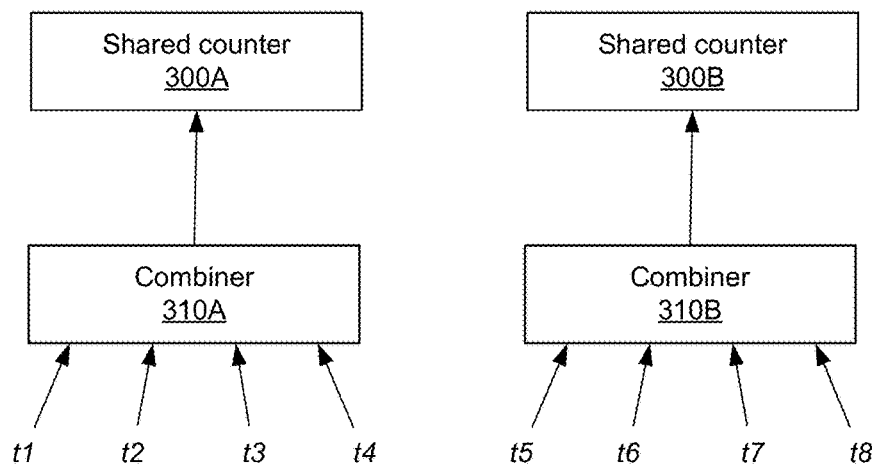

The hierarchical approach taken in embodiments may allow the structure of the machine to be reflected within the hierarchy used for work scheduling. In addition, the hierarchical approach enables the exploration of a range of complex policies within embodiments. For instance, the hierarchical approach enables exploring whether data structures should be per-core, per-level-2 cache (per-L2$), per-socket, and so on. FIGS. 3A and 3B illustrate this using an example 8-thread machine. Separate work distributors may be used for each parallel loop. For instance, the 4-thread loop led by t1 is handled separately from the 4-thread loop led by t5. FIG. 3A illustrates an example of work distribution during a level-0 loop led by t0 in which all threads participate using separate request combiners 310A and 310B on each socket and a single shared counter 300. FIG. 3B illustrates an example of work distribution during a level-0 loop led by t0 and by t5 using separate request combiners 310A and 310B on each socket and two shared counters 300A and 300B. Note that the counters 300 and combiners 310 may be implemented in hardware, by software, or as a combination thereof.

Some of the work scheduling techniques described herein may be work conserving in the sense that if one thread would be able to obtain a batch of work by invoking its work distribution object, then any other thread would be able to obtain that same batch of work. The work conserving approach may be motivated by environments in which work is executed on dynamically changing sets of resources: it may not be desirable (for instance) for some work to be only available on a given socket, only for the runtime system to receive no hardware contexts on that socket. However, at least some of the work scheduling techniques, for example the asynchronous request combining technique, may instead implement a non-work-conserving approach to work scheduling. Using the non-work-conserving approach, some threads may remain idle until needed at an inner level of parallelism, which may lead to better cache performance, for example when iterations of an inner loop at level 0 share state in a per-core cache.

As described in more detail below, each kind of distribution may define (i) a shared object forming part of the per-team structure, and initialized by the thread entering the loop (referred to as the representative thread), and (ii) per-thread iterators, held on the stack of the thread executing the loop (allocated within the run method of the work object).

Shared Counters

The simplest work distribution object may be a single shared (or global) counter. For instance, with a 0 . . . 1000 iteration space:

Next iteration: 0
Loop end: 1000

This counter may be initialized with the loop bounds, and threads may claim iterations using an atomic fetch-and-add on the next-iteration field. The single shared counter may reflect techniques used in many OpenMP runtime systems.

Distributed Counters

With this approach, in some embodiments, the iteration space may be split evenly across a number of sub-counters or "stripes" according to the number of sockets, cores, or threads within the machine. In some embodiments, other heuristics may be used. For example, in some embodiments, the number of stripes may be set subject to minimum and/or maximum constraints, such as ensuring that there is at least a specified number of iterations in each stripe (e.g., at least 1) and such that there is at most a specified number of stripes (e.g., at most 256) irrespective of the machine. For instance, with two stripes and 1000 loop iterations to be split:

| | | |
|---|---|---|
| Partition next: | 0 | 500 |
| Partition end: | 500 | 1000 |

As another example, 1000 loop iterations to distribute could be divided into ten stripes of 100 iterations each, 0-100, 100-200, and so on. In some embodiments, each thread may be associated with a home stripe (e.g., with per-socket distribution, this may correspond to the thread's socket). In addition, each thread may have a current stripe. A thread claims iterations by an atomic increment on its current stripe (initially its home stripe) until that portion of the iteration space has been completed. At that point it moves on to a subsequent stripe, and so on until it returns to its home stripe. In some embodiments, threads may try each stripe in order when moving to a subsequent stripe. In other embodiments, threads may "probe" the stripes in a non-sequential order, such as that used in quadratic probing in a hash table. In some embodiments, each stripe is allocated on its own cache line in memory at the socket of the first thread with that as its home stripe. Thus, instead of having a single memory location that all of the threads are using for atomic operations (e.g., fetch-add instructions), the instructions are spread across memory, which may reduce the likelihood of contention.

Request Combining

In some embodiments, request combiners may attempt to aggregate requests for work which are made "nearby" in time and in the machine. Instead of threads performing individual atomic operations on a shared counter, groups of threads may combine their requests into a single larger update. Combining requests can be effective under high contention: rather than have multiple threads across the machine compete for atomic updates to a single shared cache line, sets of threads can compete at a finer granularity, while a smaller number of threads compete at a global level. This reduces the number of atomic read-modify-write instructions, and increases the likelihood that contention remains in a local cache. Atomic updates on a common L1$ or L2$ are typically much faster than atomic updates on a location being accessed from multiple sockets. Conversely, combining can be a risk under low contention if it introduces costs and these are not recouped.

Figures 3C, 3D, 3E:
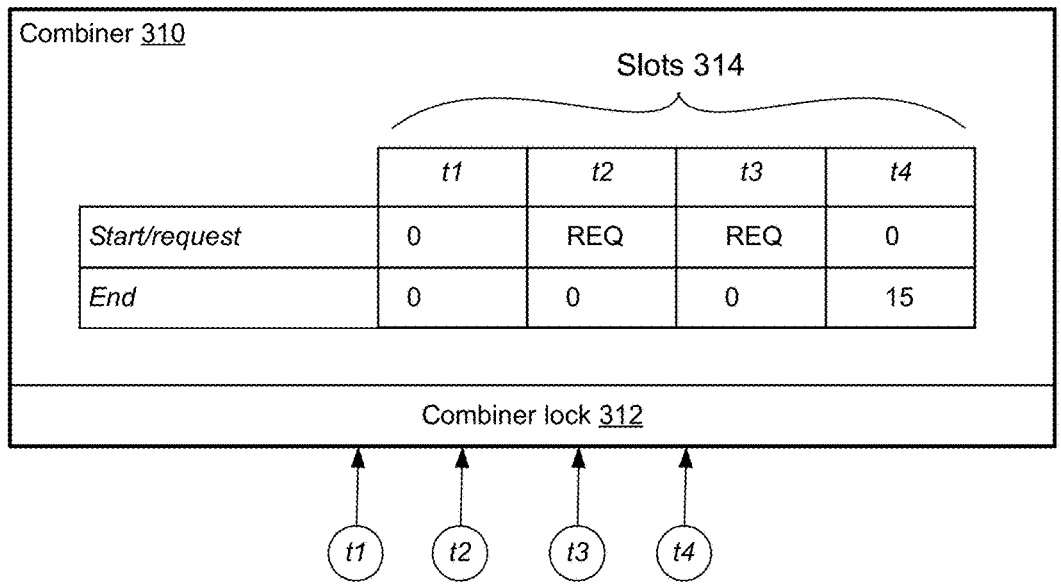
FIG. 3C illustrates an example request combiner, according to some embodiments.
FIGS. 3D and 3E illustrate an example of a representative thread aggregating work requests and distributing the acquired iterations among the requesting threads, according to some embodiments.

FIG. 3C illustrates an example request combiner 310, according to some embodiments. FIG. 3C shows an example four-slot combiner with four worker threads t1-t4. In some embodiments, each thread (in this example, threads t1-t4) using a request combiner 310 has a slot 314 in the combiner 310 that includes a pair of loop indices (referred to herein as Start/request (or simply Start) and End fields) that, when set to valid loop iteration values, indicate a starting loop index and an ending loop index for the respective thread.

In this example, a slot 314 with Start/request and End values of (0, 0) is quiescent, and a slot 314 with Start/request and End values of (REQ, 0) represents a request for work by the respective thread. Any other valid pair (e.g., (0, 16)) represents supplied work (in this example, loop iterations (0 . . . 15), inclusive, to t4). Thus, the quiescent value (0, 0) can be distinguished from supplied work by threads when reading their slots 314 because it represents an invalid range of iterations to execute. In addition, each combiner 310 has a lock (combiner lock 312) which needs to be held by a thread that is collecting requests to make to the upstream counter 300 (referred to herein as a representative thread). In some embodiments, the combiner lock 312 may be implemented as a simple spin lock; for example, 0 may indicate that the lock is available, 1 may indicate that the lock is held, and waiting until the lock is available may involve waiting until the combiner lock 312 goes back to 0. However, other lock mechanisms may be used in embodiments. In some embodiments, transactional memory may be used to update the combiner without requiring a lock.

Operations of a thread associated with a combiner 310 may be illustrated by the following example pseudo-code, which is not intended to be limiting:

```
my_slot->start = REQ;     // Issue request
while (1) {
    // Try to acquire the combiner lock
    if (!spinlock_tryacquire(&my_combiner->lock)) {
        // Lock busy (already acquired by another thread).
        // Wait for it to be released, then test if any work has been
        // received. while (spinlock_is_held(&my_combiner->lock)) {
        }
    } else {
        // The attempt to acquire the combiner lock succeeded, making
        // this thread the representative thread which collects requests
        // from other threads, issues an aggregate request, distributes
        // work, and then releases the lock.
        ...
        spinlock_release(&my_combiner->lock);
    }
    // Test if request has been satisfied
    if (my_slot->start != REQ) {
        return (my_slot->start, my_slot->end);
    }
}
```

In some embodiments, a worker thread may start by writing REQ in its slot 314 and then trying to acquire the lock 312. If the lock 312 is already held then the worker thread waits until the lock 312 is available, and tests if its request has been satisfied (i.e., that the Start/request and End fields have been set to valid loop iteration values by the representative thread). Note that the REQ flag is set by the worker thread without holding the lock 312, and so the lock holder (the representative thread) is not guaranteed to see the worker thread's request. When a thread succeeds in acquiring the lock (thus becoming the representative thread), it scans the slots for REQ and issues an upstream request for a separate batch of loop iterations for each work requester (for brevity the pseudocode for this is omitted). In some embodiments, the representative thread may issue a request for a large batch of loop iterations to satisfy the combined requirements of all threads requesting work (including itself). For example, if there are four total threads each requesting 100 iterations for work, the requester thread may issue a request for 400 loop iterations to be divided among the requesting threads. In some embodiments, the acquired work (loop iterations) is distributed by the representative thread by first writing to the End field and then overwriting REQ in the Start/request field of the combiner 310. Thus, when a worker thread reads its Start/request field, if the field has been overwritten with a valid loop iteration value, the thread knows that its End field has already been set. In other words, a thread receiving work sees the start-end pair consistently once REQ is overwritten.

In some embodiments, if all threads using a combiner 310 share a common L1$, then the request slots 314 may be packed onto as few cache lines as possible. Otherwise, each slot 314 has its own cache line.

Note that combiners 310 can be configured in various ways, in different embodiments. For instance, threads within a core could operate with a per-core combiner 310, and then additional levels of combining could occur at a per-L2$ level (if this is shared between cores), or at a per-socket level. Some of these alternatives are examined in the evaluations described below.

One embodiment of a method for aggregating requests for work is illustrated by the flow diagram in FIG. 4A. As indicated at 400, a parallel application begins executing on a multi-core machine. A set of worker threads are created for one or more hardware contexts (e.g., cores, core-pairs, sockets, or some other granularity). Each thread is associated with a request combiner 310, for example as illustrated in FIG. 3C, which is in turn associated with a shared counter 300, for example as illustrated in FIGS. 3A and 3B.

As indicated at 402, one or more of the worker threads may set the start/request field of respective slots 314 in the combiner 310 to a reserved value (shown as a REQ flag in FIG. 3C) that indicates a request for work. For example, if valid loop iteration values for the start and end fields of the slots 314 are positive integer values, the reserved value (REQ) may be a negative value. In some embodiments, the REQ flag may be set by the worker thread(s) without holding the combiner lock 312.

As indicated at 404, one or more of the worker threads that have set their start/request field to REQ in their respective slots 314 may attempt to acquire the combiner lock 312. In some embodiments, the combiner lock 312 may be implemented as a simple spin lock; for example, 0 may indicate that the lock is available, 1 may indicate that the lock is held, acquiring the lock may involve setting the lock 312 to 1, and waiting until the lock is available may involve waiting until the lock 312 goes back to 0. However, other lock mechanisms may be used in embodiments.

At 406, if one of the worker threads succeeds in acquiring the lock, then as indicated at 420, the worker thread becomes the representative thread for all threads associated with the combiner 310 (e.g., threads t1 . . . t4 in the example combiner 310 of FIG. 3C). The representative thread then collects requests for work from the other worker threads, for example by checking the Start/request fields in the threads' respective slots 314 to see which slots are set with the REQ flag. At 422, the representative thread issues an aggregate request that includes the requests collected from other threads and its own request for work. In some embodiments, the representative thread may issue an aggregate request for a large batch of loop iterations to satisfy the combined requirements of all threads requesting work (including itself). For example, if there are four total threads each requesting 100 iterations for work, the requester thread may issue a request for 400 loop iterations to be divided among the requesting threads. Upon obtaining the requested work (e.g., loop iterations from its associated shared counter 300 as illustrated in FIGS. 3A and 3B), the representative thread distributes the work (e.g., acquired loop iterations) to the requesting threads, for example by setting the Start and End fields in the respective slots 314 of the requesting threads. After distributing the work to the requesting threads on the combiner 310, the representative thread releases the combiner lock 312 (and thus gives up its current position as the representative thread). The thread may then begin executing its work, as indicated at 412.

While not shown in FIG. 4A, after combining the work requests, the total request for work may exceed the work available. For example, 400 loop iterations may be requested by the representative thread, while the loop may only have 300 iterations remaining. In some embodiments the representative thread may divide the work obtained (e.g., 300 iterations) by the number of threads requesting work (e.g., 4). Toward the end of executing a loop, in some cases the amount of work remaining may be so small that there is not enough work for all threads to receive any work at all (e.g., 3 loop iterations remaining, with requests from 4 threads). In some embodiments, the representative thread may provide the remaining iterations to one of the threads (or to itself), and return an empty work indication to the other threads which do not receive work, for example by setting the threads' Start/request and End values in their respective slots to values representing an invalid loop count. For example, the pair (1000, 1000) may be set for threads which receive no work at the end of a 1000-iteration loop.

FIGS. 3D and 3E illustrate an example of a representative thread (indicated by the shaded circle) aggregating work requests and distributing the acquired iterations among the requesting threads, according to some embodiments. In FIG. 3D, one of the threads (e.g., t1 in FIGS. 3A and 3B) has acquired the combiner lock 312, and has thus become the representative thread for the combiner 310. The start/request field in slots for threads t2 and t3 (as well as its own start/request field) are set to the REQ flag. Note that the slot for thread t4 is not set. The representative thread aggregates the requests and issues an aggregate request for a batch of loop iterations to satisfy the combined requirements of all threads requesting work (including itself). For example, if each requesting thread requires 100 loop iterations, the representative thread requests 300 loop iterations. In FIG. 3E, upon obtaining the loop iterations in response to the aggregate request, the representative thread distributes the loop iterations to the requesting threads (including itself), for example by setting the Start and End fields in the respective slots 314 of the requesting threads. In some embodiments, the acquired work (loop iterations) is distributed by the representative thread by first writing to the End field and then overwriting REQ in the Start/request field of the combiner 310. Thus, when a worker thread reads its Start/request field, if the field has been overwritten with a valid loop iteration value, the thread knows that its End field has already been set. In this example, the representative thread (a) has set the start and end fields for thread t1 (itself) to 0 . . . 100, t2 to 100 . . . 200, and t3 to 200 . . . 300, each representing ranges starting at the lower level and going to (but not including) the higher value. As thread t4 had not made a work request by setting its Start/request field to REQ at the time that t1 became the representative thread and checked the start/request fields in combiner 310, no work was acquired for t4, and none is distributed to t4.

Referring again to FIG. 4A, at 406, for others of the worker threads that do not succeed in acquiring the combiner lock 312 (and thus that are not currently the representative thread), the method proceeds to element 408. At 408, the worker thread(s) wait for the combiner lock 312 to be released. Upon release of the combiner lock 312, at 410, if a worker thread's request for work is not satisfied (e.g., if its Start/request field in the combiner is still set to REQ), then the thread loops back to element 404. At 410, if a worker thread's request for work is satisfied (e.g., its Start/request field and End field have been set by the representative thread), then the worker thread proceeds to element 412. At 412, the worker thread(s) execute the work they have been assigned (e.g., their slice of the loop iterations distributed by the representative thread). After completing its work (loop iterations), at 414, if more work is available, then the worker thread(s) return to element 402. Otherwise, the thread(s) are done with work, at least for this work loop at this level.

While not shown, in some embodiments, if the representative thread determines there is no more work for the threads (e.g., from the response to the aggregate request sent to the shared counter 300), the representative thread may set the Start/request field for the other threads in the slots 314 to a reserved value that indicates there is no more work for the threads to perform (which may be referred to as a termination or "finished" flag). However, other methods of terminating work may be used in some embodiments. Note also that, in some embodiments, the response may indicate a partial fulfillment of the aggregate request, in which case the representative thread may allocate the provided loop iterations to one or more of the worker threads to complete the work, and may set the slots 314 for other threads to the termination flag.

Asynchronous Request Combining

In the request combining work distribution technique illustrated in FIG. 4A, threads obtain work as distributed by the current representative thread via the combiner 310, execute their assigned work, and then set their request flags to obtain more work once finished with their assigned batch of work. Thus, once a thread sets its request flag, it may have to wait to obtain additional work. Another work distribution technique that may be employed in some embodiments of the systems described herein is to perform request combining asynchronously with work execution. This asynchronous request combining technique is similar to the technique shown in FIG. 4A; however, a thread sets its request (REQ) flag before (or while) executing a current batch of work, rather than after finishing assigned work as illustrated in FIG. 4A. Once the request flag is set, the thread may execute any work it has outstanding asynchronously with waiting to be distributed more work by the representative thread via the combiner 310. This asynchrony exposes a work request over a longer interval: other threads using the same combiner 310 may handle the request while the thread's current batch is being executed.

In a best case example using the asynchronous request combining technique, in a set of n threads, all but one thread will find they have received new work immediately after finishing their current batches of work. Furthermore, if additional combining occurs, this increases the size of the aggregate requests issued from the combine 310 (reducing contention on the next level in the work distribution tree). This may reduce contention on the lock 312 used within the combiner 310 since, if most threads are receiving work immediately after finishing their current batches, then the threads may seldom or never need to acquire the lock 312. A fast-path for the n–1 threads receiving work is (i) reading the work provided to them from their respective slots 314, and (ii) setting their request flag to the reserved value. On a TSO memory model, the asynchronous request combining technique may help avoid fences or atomic read-modify-write instructions.

FIG. 4B is a flow diagram of an asynchronous request combining technique, according to some embodiments. As indicated at 450, a parallel application begins executing on a multi-core machine. A set of worker threads are created for one or more hardware contexts (e.g., cores, core-pairs, sockets, or some other granularity). Each thread is associated with a request combiner 310, for example as illustrated in FIG. 3C, which is in turn associated with a shared counter 300, for example as illustrated in FIGS. 3A and 3B.

As indicated at 452, one or more of the worker threads may set the start/request field of respective slots 314 in the combiner 310 to a reserved value (shown as a REQ flag in FIG. 3C) that indicates a request for work. For example, if valid loop iteration values for the start and end fields of the slots 314 are positive integer values, the reserved value (REQ) written to the start/request field of the slots 314 may be a negative value. In some embodiments, the REQ flag may be set by the worker thread(s) without holding the combiner lock 312.

At 453, after setting its respective slot 314 to request work, if a worker thread has any work pending (e.g., work previously assigned by a representative thread), then the worker thread may begin or continue to execute its outstanding assigned work as indicated at 454. Note that executing the outstanding assigned work at element 454 is performed asynchronously with worker thread(s) attempting to obtain additional work from the combiner 310 (elements 456-462), and asynchronously with a worker thread serving as the representative thread (elements 470-472) after setting the slots 314 to request work at 452. After completing its work at element 454, the worker thread may proceed to element 462 to check if its request for work has been satisfied.

At 453, after setting its start/request field to REQ in its respective slots 314, if a worker thread does not have work pending, then the worker thread may proceed to element 456 and attempt to acquire the combiner lock 312. In some embodiments, the combiner lock 312 may be implemented as a simple spin lock; for example, 0 may indicate that the lock is available, 1 may indicate that the lock is held, acquiring the lock may involve setting the lock 312 to 1, and waiting until the lock is available may involve waiting until the lock 312 goes back to 0. However, other lock mechanisms may be used in embodiments.

At 458, if one of the worker threads succeeds in acquiring the lock, then as indicated at 470, the worker thread becomes the representative thread for all threads associated with the combiner 310 (e.g., threads t1 . . . t4 in the example combiner 310 of FIG. 3C). The representative thread then collects requests for work from the other worker threads, for example by checking the Start/request fields in the threads' respective slots 314 to see which slots are set with the REQ flag. At 472, the representative thread issues an aggregate request that includes the requests collected from other threads and its own request for work. In some embodiments, the representative thread may issue an aggregate request for a large batch of loop iterations to satisfy the combined requirements of all threads requesting work (including itself). For example, if there are four total threads each requesting 100 iterations for work, the requester thread may issue a request for 400 loop iterations to be divided among the requesting threads. Upon obtaining the requested work (e.g., loop iterations from its associated shared counter 300 as illustrated in FIGS. 3A and 3B), the representative thread distributes the work (e.g., acquired loop iterations) to the requesting threads, for example by setting the Start and End fields in the respective slots 314 of the requesting threads. After distributing the work to the requesting threads on the combiner 310, the representative thread releases the combiner lock 312 (and thus gives up its current position as the representative thread). FIGS. 3D and 3E illustrate an example of a representative thread aggregating work requests and distributing the acquired iterations among the requesting threads, according to some embodiments.

At 458, for others of the worker threads that do not succeed in acquiring the combiner lock 312 (and thus that are not currently the representative thread), the method proceeds to element 460. At 460, the worker thread(s) wait for the combiner lock 312 to be released. Note that one or more worker threads may be performing work asynchronously as indicated at 454. Upon detecting release of the combiner lock 312, a worker thread may proceed to element 462 to check if its request for work has been satisfied.

At 462, if a worker thread's request for work is not satisfied (e.g., if its Start/request field in the combiner is still set to REQ), then the thread loops back to element 456. At 462, if a worker thread's request for work is satisfied (e.g., its Start/request field and End field have been set by the representative thread), then the worker thread may again set its respective slot 312 to the reserved value (REQ) to request work as indicated at 452, and may begin or continue executing work asynchronously as indicated at 454 while waiting for additional work to be allocated via the combiner 310.

While not shown, in some embodiments, if the representative thread determines there is no more work for the threads (e.g., from the response to the aggregate request sent to the shared counter 300), the representative thread may set the Start/request field for the other threads in the slots 314 to a reserved value that indicates there is no more work for the threads to perform (which may be referred to as a termination or "finished" flag). However, other methods of terminating work may be used in some embodiments. Note also that, in some embodiments, the response may indicate a partial fulfillment of the aggregate request, in which case the representative thread may allocate the provided loop iterations to one or more of the worker threads to complete the work, and may set the slots 314 for other threads to the termination flag.

In some embodiments, all of the worker thread(s) are responsible for executing work, for indicating requests for new work to a combiner, and for obtaining work as the "representative thread" of that combiner. However, in other embodiments, some threads may be dedicated to obtaining work (e.g., acting as a representative thread) without executing the work themselves.

Integrating Fine-grained Scheduling of Parallel Loops in Systems

As previously noted, in some embodiments, the techniques described herein for fine-grained scheduling of parallel loops may be integrated with previous work on coordinating multiple parallel workloads on a shared machine (e.g., integrating embodiments of the runtime system as described herein with earlier work on scheduling multiple parallel applications together on a shared machine). For instance, the runtime system may benefit from explicit notifications of the changes in resource availability implemented in an earlier runtime system (e.g., an execution framework that includes a resource management layer between a resource-management-enabled runtime system and the system-wide scheduler of the operating system that is referred to herein as "the execution framework"). As described below and illustrated in FIGS. 5 and 6, this execution framework has been shown to be useful for prototyping schedulers, in some embodiments.

In various embodiments, the parallel loop scheduling techniques described herein may be applied in any multi-socket system. For example, in some embodiments, they may be applied in systems that implement dynamic co-scheduling of hardware contexts when executing multiple parallel applications, such as the execution framework described herein. In some such embodiments, a multi-core computer in such a system may implement a resource management layer between the operating system and one or more runtime systems that have been modified to work with components of the resource management layer. The resource management components and resource-management-enabled runtime systems may be configured to work together to use the hardware contexts of the machine efficiently, while reducing load imbalances between multiple parallel applications and avoiding the preempting of threads at inconvenient times.

In some embodiments, runtime systems performing work on behalf of different applications may receive resources on a varying number of hardware contexts as demands of the applications change over time. In some embodiments, the resource management components of the system may co-ordinate to leave exactly one runnable software thread for each hardware context. In some embodiments, the systems described herein may allocate and/or re-allocate hardware threads to various jobs (or worker threads thereof) according to a spatial scheduling policy that grants high priority to one application per hardware context and a temporal scheduling policy that specifies how and when unused hardware contexts should be re-allocated. For example, decisions about whether and/or when to re-allocate hardware contexts may be dependent on whether a job has been granted high priority on a given hardware context or on whether a job that has been granted high priority on a given hardware context has run out of work. In embodiments of the system that implement fine-grained scheduling of parallel loops as described herein, priority for allocating a given hardware context may be given to an application that has been determined to be compatible with another application that is already executing on the same socket as the given hardware context (e.g., one that does not have the similar demands for scarce shared resources of the socket).

In some embodiments, periodic check-in operations may be performed by the runtime systems (e.g., between tasks or between batches of work items) and may be used to determine (at times convenient to the applications) whether and when various hardware contexts should be re-allocated. The systems described herein may over-subscribe worker threads (e.g., associating a worker thread for each application with each of the hardware contexts in the computer), which, in combination with the dynamic scheduling policies described herein, may reduce load imbalances between the applications. A co-ordination table maintained by the resource management components may store per-hardware-context information about resource demands and allocations. This information may be accessible to the applications and/or the runtime systems, and may be used in determining when and how hardware contexts should be-reallocated.

In some embodiments, applications that are written for and/or compiled over an unmodified runtime system may be run on a resource-management-enabled version of the runtime systems without modification. A common API for synchronization operations that is based on latches and synchronization variables may be used by parallel applications, by resource-management-enabled runtime systems, and by the resource management components, and may provide a single place at which to determining spin/wait decisions for waiting threads and common methods for making those decisions consistently.

Figure 6:
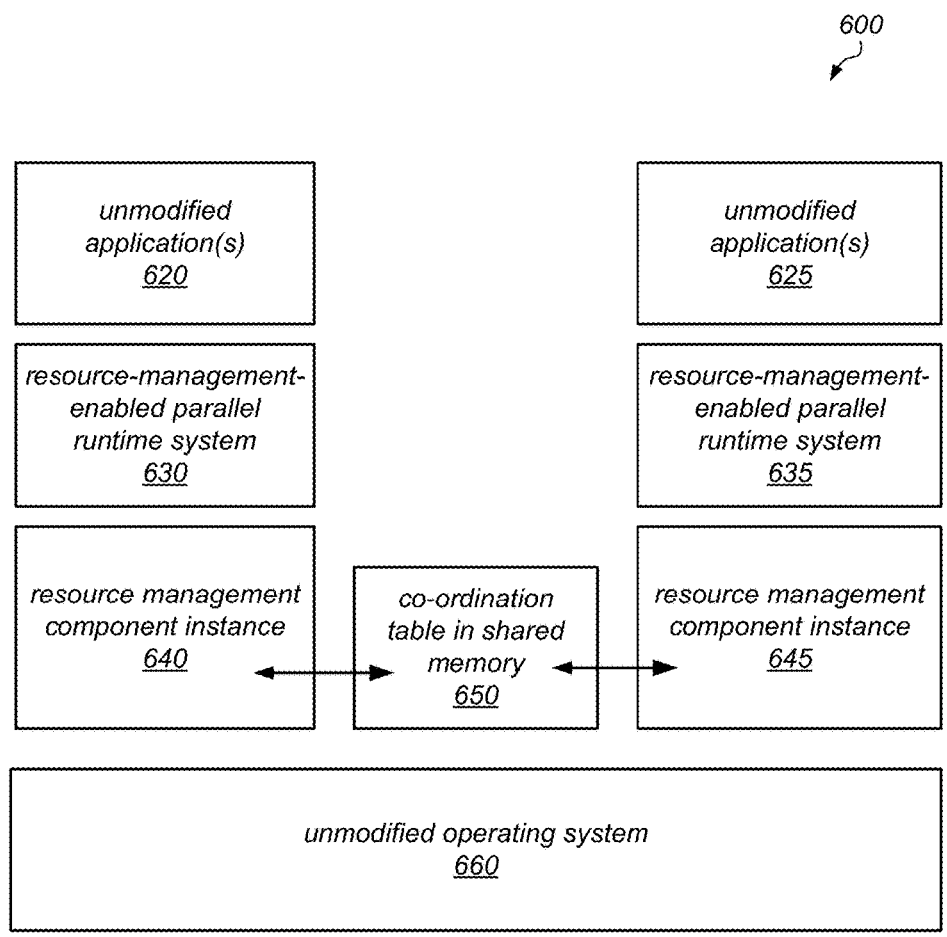
FIG. 6 is a block diagram illustrating an example of the physical structure of a resource-management-enabled runtime system that employs the fine-grained scheduling of parallel loops, according to some embodiments.

In some embodiments, a resource-management-enabled runtime system that employs the fine-grained scheduling of parallel loops described herein may use dynamic spatial scheduling to allocate threads to physical cores. An example of the physical structure of one such runtime system is illustrated in FIG. 6 and described below. In some embodiments, every program running on the system spawns and pins a thread to every core. Of the threads pinned to each core, one is designated as the high priority thread, and the remaining threads are designated as low priority threads. The resource management components of the system may ensure that each program has a fair share of high priority threads, and that the main thread for each program is given high priority. This approach may ensure that the main thread can always run, since it often acts as a producer of parallel tasks, and (in such cases) its performance may be critical to the performance of the program as a whole. This approach may also provide a fair distribution of resources across all running programs.

The aim of the execution framework described herein may be to allow the high priority threads to run the majority of the time. This may mean that the high priority threads experience minimal interference from other threads running on the system. For example, they may be able to make full use of core-local caches, without the threat of other programs evicting cache lines that would lead to performance degradation. This approach may also reduce the number and frequency of context switches, thus reducing the overhead they incur.

In some embodiments of the execution framework, in order to maintain good utilization of resources, a low priority thread may be allowed to run when the high priority thread pinned to a particular core is not runnable (e.g., when and if the high priority thread blocks for memory accesses or synchronization). Due to the bursty nature of many parallel workloads (and many of the benchmarks used in the evaluations described herein), this approach may help to make good use of the available hardware resources. In some embodiments, the execution framework may limit the frequency with which context switching to low priority threads can occur using a manually specified hysteresis threshold. In some embodiments, if a high priority thread blocks for longer than a fixed number of processor cycles, it may be stopped and a low priority thread may be allowed to run. The high priority thread may only be allowed to run again after it has been runnable for sufficiently many processor cycles (e.g., for at least a pre-determined number of cycles that may be user configurable).

One existing runtime system that may be modified to use the resource management and dynamic scheduling techniques described herein (including fine-grained scheduling of parallel loops) is the OpenMP (Open Multi-Processing) programming model which encompasses runtime system components and associated programming language abstractions. OpenMP is a conventional runtime system for parallel programming in which the primary way that the program expresses work that can be split over multiple hardware contexts is by using a parallel for loop, and in which batches of these loop iterations can be executed in parallel on the different hardware contexts. For example, if a loop has 1000 iterations and there are 10 hardware contexts, the work may be split evenly across the hardware contexts, and each hardware context may be responsible for performing 100 of the loop iterations.

Traditionally, tuning OpenMP jobs may be assumed to be done by the programmer, and the language specification makes it difficult for a runtime system to adapt the number of threads in use without violating the specification. In existing OpenMP runtime systems, it is generally considered to be a bad thing to over-subscribe the system (i.e., to use more OpenMP threads than there are hardware contexts in the processors). However, in some embodiments of the systems described herein, it has been observed that combining over-subscription with a lightweight cooperative mechanism for switching between threads may avoid the main synchronization costs of oversubscription, while reducing the load imbalances between jobs when running on a dynamically variable number of hardware contexts. In such embodiments, the more OpenMP threads there are, the easier they may be to share evenly between hardware contexts. The results of experiments performed on prototype systems indicate that this approach may reduce the likelihood of interference, reduce the severity of any interference, and/or increase the ability for jobs to benefit from otherwise-idle time in the execution of other jobs.

Figure 5:
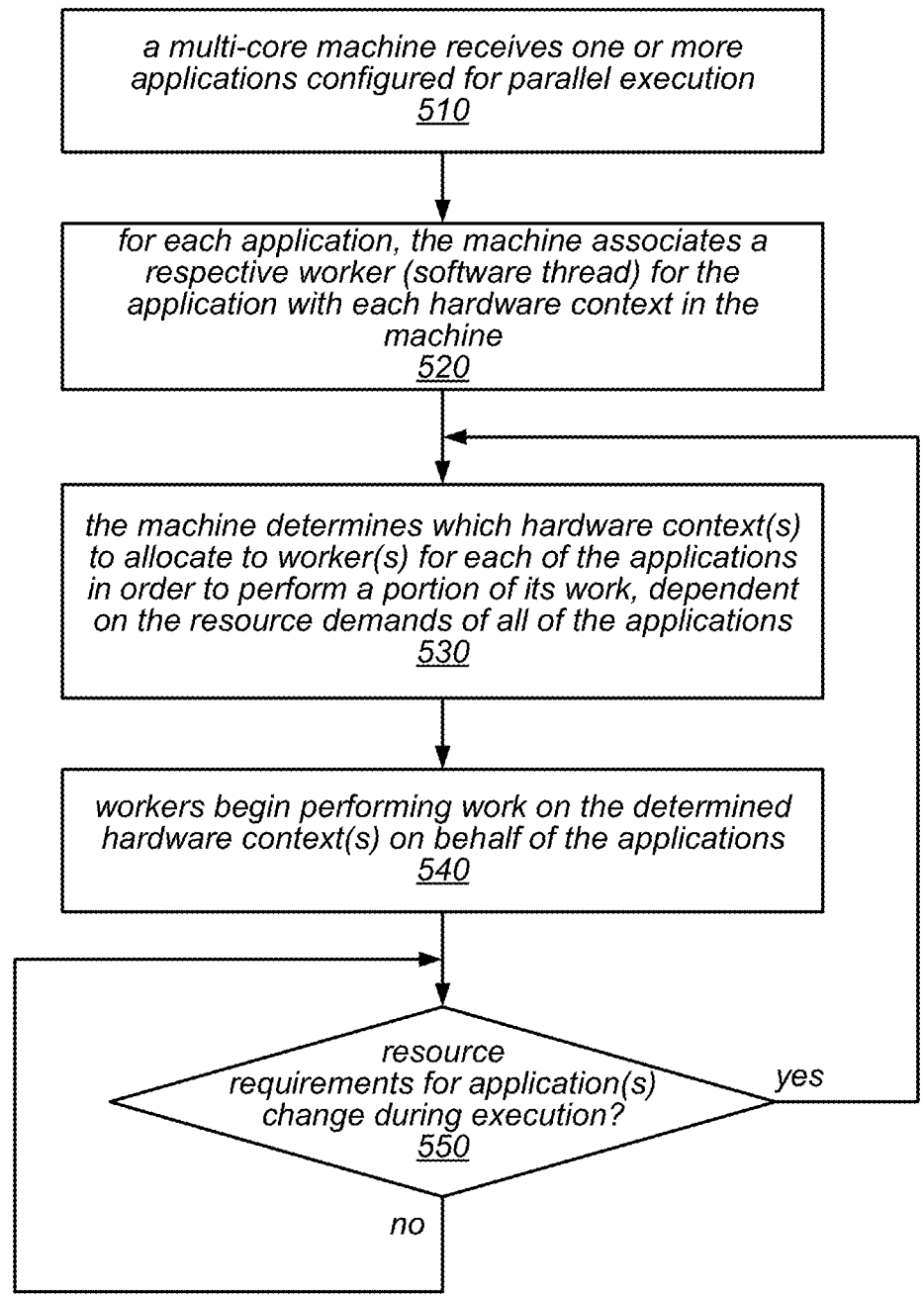
FIG. 5 is a flow diagram of a method for dynamically scheduling parallel applications for execution by runtime systems on a single machine, according to some embodiments.

One embodiment of a method for dynamically scheduling parallel applications for execution by runtime systems on a single machine is illustrated by the flow diagram in FIG. 5. As illustrated at 510, in this example, the method may include a single multi-core machine receiving one or more applications configured for parallel execution. For example, the runtime system may be a resource-management-enabled runtime system executing over an operating system on a multi-core machine, and it may receive an initial application to be executed or a collection of applications to be executed. The method may include, for each application, the machine (or the runtime system or a resource management component executing thereon) associating a respective worker (e.g., a software thread) for the application with each hardware context in the machine, as in 520.

As illustrated in this example, the method may include the machine (or the runtime system or resource management component executing thereon) determining which hardware context or hardware contexts to allocate to various workers for each of the applications in order to perform a portion of its work, dependent on the resource demands of all of the applications, as in 530. For example, during an initial allocation (when the application or collection of applications is received), the method may include allocating a hardware context to each of two or more workers for each application to perform an initial batch of operations (e.g., some number of loop iterations) for each application. The method may also include the workers beginning to perform work on the determined hardware context(s) on behalf of the applications, as in 540. For example, in some embodiments, each of the workers may make an up-call to an activate function of the resource-management-enabled runtime system in order to claim their respective hardware contexts and being performing work.

If the resource requirements for one or more of the applications change during execution (shown as the positive exit from 550), the method may include repeating at least some of the operations illustrated in FIG. 5 (e.g., beginning at element 530), in order to re-allocate some or all of the hardware contexts as necessary (e.g., according to various applicable policies) and continuing execution of one or more applications. For example, such a re-allocation may be performed in response to the starting and/or completing of various items of work or batches of work items, in response to an executing application (job) reaching completion and/or in response to the submission of an additional application (job). Note that, as described in more detail below, some of the conditions that can trigger such a re-allocation may be detected during execution of a check-in operation. In the example illustrated in FIG. 5, when and if a re-allocation is performed, the machine may allocate one or more of the hardware contexts to perform another batch of work items for the same application on whose behalf the hardware contexts were previously allocated, and/or may allocate one or more of the hardware contexts to different applications than the ones on whose behalf the hardware contexts were previously allocated (assuming they have runnable work). While resource requirements for a set of concurrently executing applications do not change during execution, the method may include the machine continuing to perform work using the current hardware context allocations. This is illustrated in FIG. 5 by the feedback from the negative exit of 550 to its input.

As previously noted, some issues related to scheduling parallel jobs may be exacerbated by the fact that parallel jobs increasingly have burstier CPU demands than traditional workloads. For example, some graph analytics jobs may have CPU demands that vary over 10-100 ms timescales. This variability may provide an impetus to combine jobs, exploiting idle time in one job to make progress in another job.

In various embodiments, the systems described herein may employ any or all of the following techniques to improve performance:

Multiple parallel jobs may co-ordinate their resource demands to leave exactly one runnable software thread for each hardware context. This approach may, in general, avoid the operating system preempting threads transparently.

CPU time may be provided to runtime systems using an up-call mechanism, inspired by scheduler activations. In some embodiments, with this approach, a runtime system may divide its work into small pieces that generally run to completion within each of these up-calls, and that can be multiplexed over however many hardware contexts the runtime system receives.

A single API may be provided for building the synchronization primitives exposed to applications (e.g., locks and barriers), for the synchronization within a runtime system (e.g., managing task pools), and for synchronization within the resource management components themselves. In some embodiments, by combining these three kinds of synchronization, information about which runtime system work is able to execute (e.g., is runnable) may be exposed to the resource management components, and a single point may be provided at which to make spin/block decisions.

One embodiment of a system that implements resource management components and resource-management-enabled runtime systems (and that may be extended to implement fine-grained scheduling of parallel loops), as described herein, is illustrated by the block diagram in FIG. 6. More specifically, FIG. 6 illustrates the overall structure of an example implementation of such a system. In this example, each of the resource management component instances operates as a user-mode shared library that links with resource-management-enabled versions of different runtime systems to implement dynamic co-scheduling of hardware contexts for runtime systems, as described herein. In this example, multiple instances of the library interact through shared memory to cooperatively control the use of the hardware contexts of the machine on which the system is implemented. As previously noted, the runtime systems may be adapted for use with the resource management component instances. However, applications built over these runtime systems (i.e., applications built for executing over the runtime systems prior to their modification for use with the resource management component instances) may operate without modification, and there may be no need to make changes to the underlying operating system in order to support the resource management components and resource-management-enabled runtime systems.

In the example illustrated in FIG. 6, a system 600 includes one or more unmodified applications 620 that are running over resource-management-enabled runtime system 630, and one or more unmodified applications 625 that are running over resource-management-enabled runtime system 635. Note that, in different embodiments, resource-management-enabled runtime systems 630 and 635 may be runtime systems of the same type or different types. For example, in one embodiment, runtime system 630 may be a resource-management-enabled version of an OpenMP runtime system, while runtime system 635 may be a resource-management-enabled version of a task-pool-based runtime system. In other embodiments, both runtime system 630 and runtime system 635 may be resource-management-enabled versions of an OpenMP runtime system, or both runtime system 630 and runtime system 635 may be resource-management-enabled versions of task-pool-based runtime system.

In this example, each resource-management-enabled runtime system links to resource management library functions in a respective resource management component instance. For example, resource-management-enabled runtime system 630 makes calls into resource management component instance 640, and resource-management-enabled runtime system 635 makes calls into resource management component instance 645. Both resource management component instance 640 and resource management component instance 645 operate over an unmodified operating system 660 (which may be one of any of a variety of operating systems). As described in more detail herein, and resource management component instance 640 and resource management component instance 645 coordinate resource allocation (e.g., the allocation of hardware contexts to various jobs and/or work items thereof) through a co-ordination table in shared memory 650.

Typically, with OpenMP (and with other runtime systems that can be modified to use the resource management techniques described herein), applications compiled for the unmodified runtime system may expose a large amount of work that is able to run in parallel. While it may be possible for an application (e.g., an OpenMP application) to request explicit numbers of threads, this usage is not typical. Instead, the number of threads may typically be set by the user when they start the application. In some embodiments, rather than relying on the user to set the number of threads, a resource-management-enabled OpenMP runtime system may use an interface (such as one described in more detail below) to express its own work to one of the resource management components described herein. In some embodiments, the management of the co-ordination table may be entirely the responsibility of these resource management components.

In some embodiments (including in prototypes that may be built to demonstrate the techniques described herein)

these resource management components may be implemented as shared libraries running in user mode as part of these applications. However, in other embodiments, they may be implemented as part of the operating system kernel, with the benefit that this approach protects the shared data structure from corruption by the application or by a bug in one of the runtime systems, at a cost of extra transitions between user mode and kernel mode and extra engineering effort to build them in the kernel.

Evaluation of Embodiments of the Runtime System

As previously noted, the performance of an embodiment of the runtime system described herein has been evaluated using three different machines of two different processor architectures. Note, however, that embodiments may be implemented in other machines and/or architectures:

Intel® 64. X4-2 is a 2-socket Intel® Xeon machine with E5-2650 Ivy Bridge core processors. Processors have a per-socket L3$, and per-core L2$ and L1$. Each core provides two hardware contexts for a total of 32 hardware contexts. GCC 4.7.4 and Linux 2.6.32 are used. (A subset of the results were confirmed on Linux 3.14.33 but no difference was seen: the runtime systems are set to employ user-mode synchronization using atomic instructions rather than futex system calls).

Oracles SPARC. T5-8 is an 8-socket machine with SPARC T5 processors. As with the Intel® 64 systems, the T5-8 has per-socket L3$ caches, and per-core L2$ and L1 $. T7-4 is a 4-socket machine with SPARC M7 processors, and may more generally be referred to as a 4-socket M7 machine. Each processor has a 64 MB partitioned L3$, with one partition per four cores. Each pair of cores shares an L2-D$. Each core has a private L1$ and eight hardware contexts. Both SPARC machines have 1024 hardware contexts. Solaris Studio 12.4 on Solaris 11.2 was used.

Both architectures provide atomic compare-and-swap (CAS). The Intelx 64 architecture provides additional atomic operations such as fetch-and-add. Conversely, the SPARC M7 processor provides user-mode-accessible ldmonitor/mwait instructions which halt a h/w context until an update is made to a memory location being monitored (or a configurable timeout expires). This avoids a hardware context using pipeline resources while waiting.

The software threads were spread as widely as possible within the machine. OpenMP with active synchronization was used (i.e., spinning, rather than blocking in the OS). For each algorithm-machine combination, the fastest result is achieved with active synchronization rather than blocking. In the RTS, on SPARC mwait is used when waiting on the T7-4 system. On the T5-8 a spinning loop with three rd%ccr, %g0 instructions are used (these are, in effect, a high-latency no-op to reduce demand on pipelines while waiting). Median-of-3 results are reported.

Three evaluation workloads are used: a scalability microbenchmark, graph algorithms with a single level of parallelism, and an additional graph workload using nested parallelism.

Work Scheduling Microbenchmarks

One experiment used CPU-bound microbenchmark with a single large loop. Each iteration performs a variable amount of work (incrementing a stack-allocated variable a set number of times). In different runs of these experiments, the following were varied: (i) the number of increments used in the different iterations, (ii) the number of threads, (iii) the work scheduling mechanism we use, and (iv) the batch size in which threads claim work. Two ways of distributing work within the loop were investigated, one with work evenly distributed across iterations, and another skewed with a mix of long iterations and short iterations. Note that, rather than presenting absolute timing, these results may be presented normalized to the expected time which would be achieved with perfect scaling and no loop distribution overhead, and may also show batch size as cycles or µ s rather than iterations.

Even Distribution

Figure 7A:
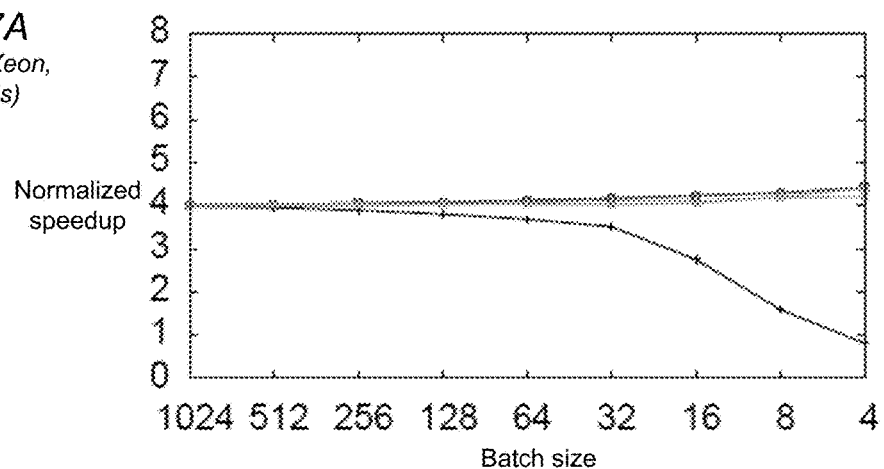
Figure 7B:
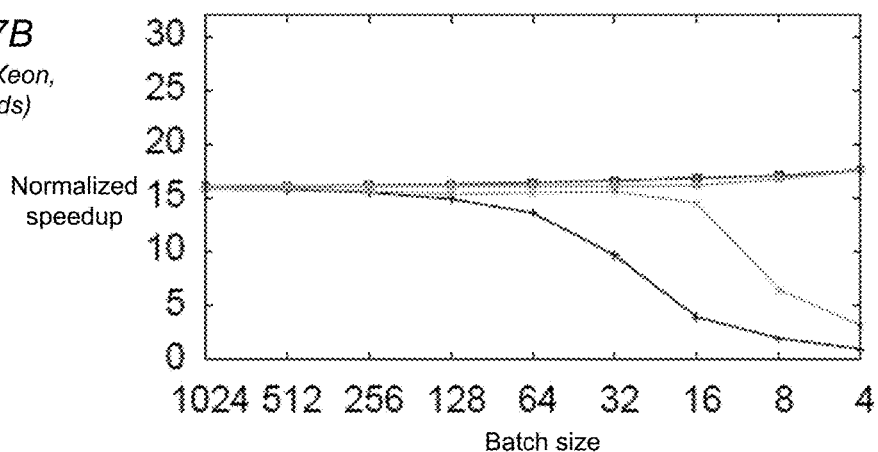
Figure 7C:
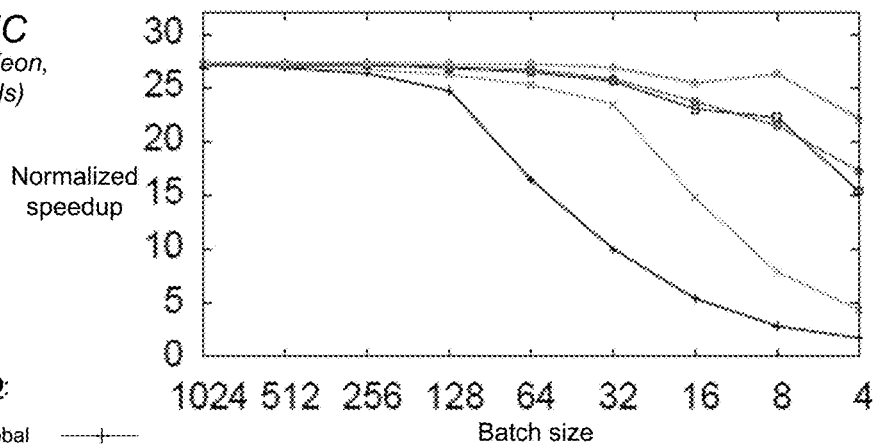
Figure 7D:
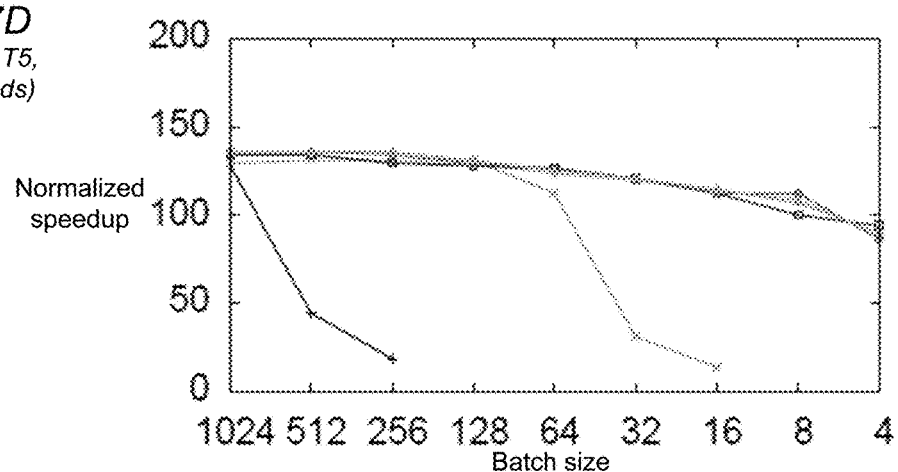
Figure 7E:
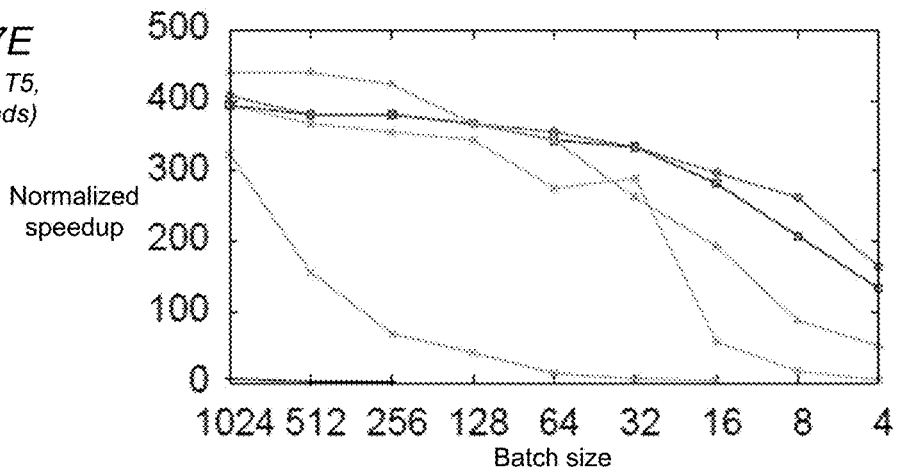
Figure 7F:
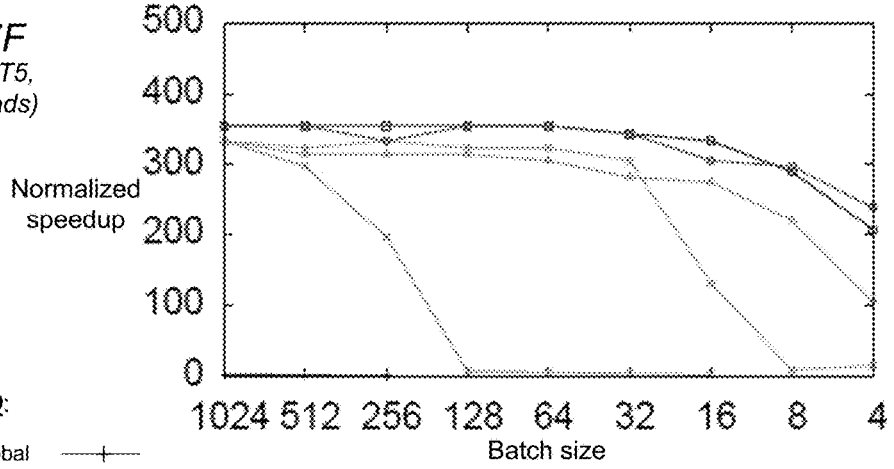

Using even distribution, each iteration performs the same amount of work: good load balancing can be achieved by splitting the iteration space evenly. We evaluate six scheduling techniques: a single shared counter, distributed counters at per-socket, per-core, and per-thread granularities, and finally per-core work combiners coupled with per-core counters. The performance of the micro-benchmark scalability experiments (with even work distribution) on the systems that were tested is illustrated in FIGS. 7A-7I. Results for the 2-socket Intel® 64 Xeon are shown in FIGS. 7A-7C, results for the Oracle® SPARC 8-socket T8 are shown in FIGS. 7D-7F, and results for the Oracle® SPARC 4-socket M7 (T7-4) are shown in FIGS. 7G-7I. For each system, FIGS. 7A-7I shows a low-contention workload with a modest number of threads (FIGS. 7A, 7D, and 7G), a workload with one thread per core (FIGS. 7B, 7E, and 7H), and a workload with all hardware contexts in use (FIGS. 7C, 7F, and 7I). The speedup relative to unsynchronized sequential code on the same machine is plotted.

On the Intelx 64 system (FIGS. 7A-7C), a single iteration is around 50 cycles. The per-core and per-thread counters perform well across the experiments. Request combining performs slightly worse than simple per-thread or per-core counters, as little combining occurs with only two threads per core.

On the SPARC systems (FIGS. 7D-7I), each iteration is around 140 cycles. At large batch sizes, good scaling to 512 hardware contexts is seen. On the T7-4 an additional improvement is seen using all 1024 hardware contexts. The single-thread IPC is 0.34 and so, with two pipelines per core, it would be expected to saturate the cores with 750 threads. Combining shows slight benefits at high thread counts and low batch sizes. As expected, the CAS loop used to increment the counters starts to need re-execution under higher contention (on Intel® 64 an atomic fetch-and-add can be used). Re-execution consumes pipeline resources that could otherwise be used productively.

For this workload the only time that threads wait is on the combiner locks during work distribution. For these cases the performance using mwait and simply spinning for the lock is plotted. Slight improvements were observed from using mwait under high contention when performing synchronous combining (with 1024 threads, a 5% reduction in execution time at batch sizes 8 and 16).

There was less lock contention with asynchronous combining, and hence little waiting. Asynchronous combining generally aggregates requests from all of the active threads in a core irrespective of the batch size used (e.g., with 256 threads, 2 per core, each combined request is for 2 batches). Synchronous combining is effective only when the batch sizes are small, making requests more likely to "collide".

Skewed Distribution

In a skewed workload, the first n iterations each contained 1024× the work of the others. In these experiments, n was set so that the total work across all iterations was the same as the even distribution. An aim was to study the impact of different work distribution techniques when there is contention in the runtime system because a simple equal partitioning of iterations between cores or threads leads to load imbalance. For example, threads that start at the "light" end of the iteration space will complete their work quickly and start to contend with threads at the "heavy" end of the space.

Figure 8A:
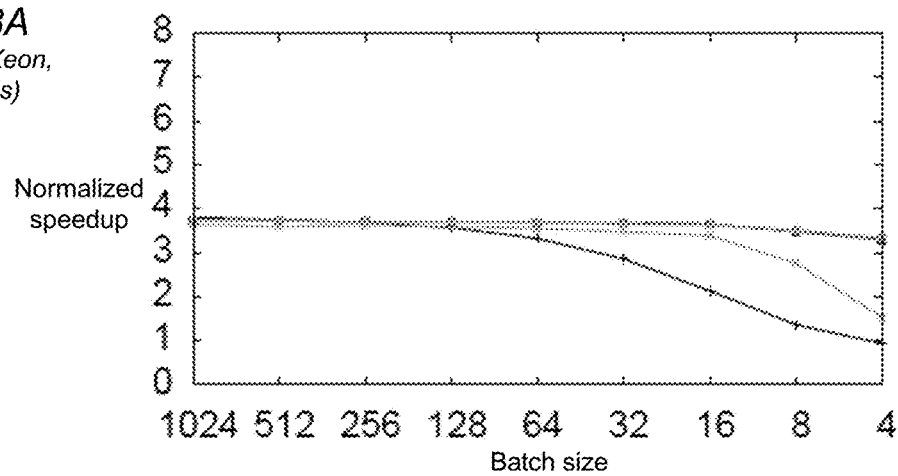
FIGS. 8A-8I graphically illustrate performance of microbenchmark scalability experiments with skewed work distribution, according to some embodiments.
Figure 8B:
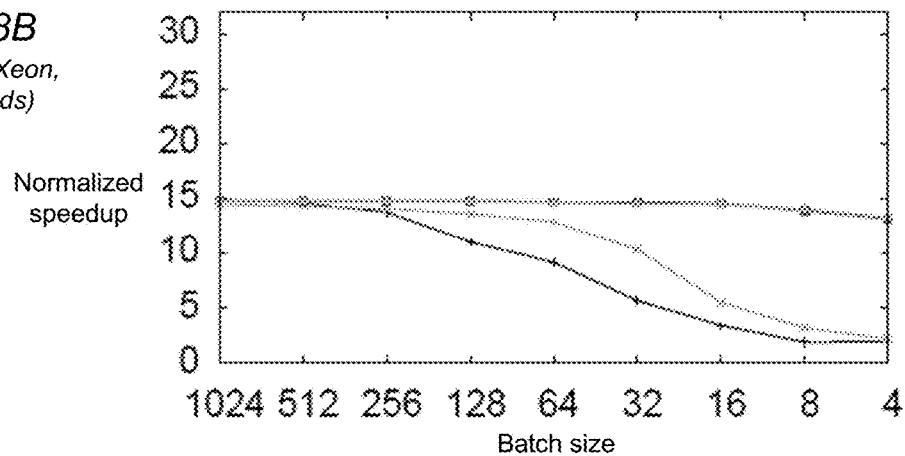
Figure 8C:
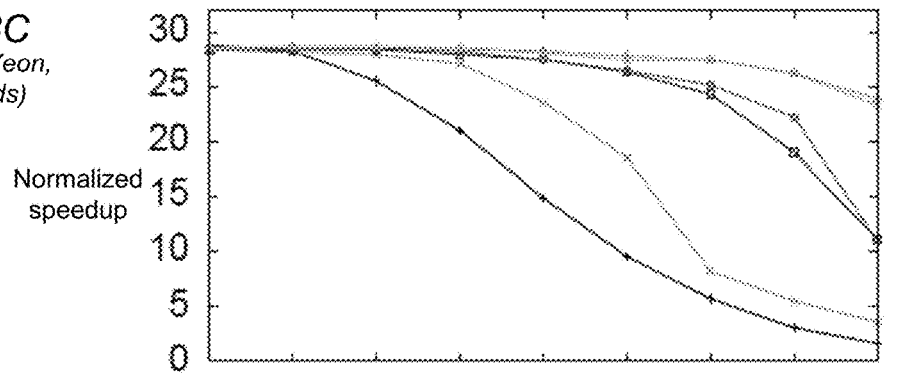
Figure 8D:
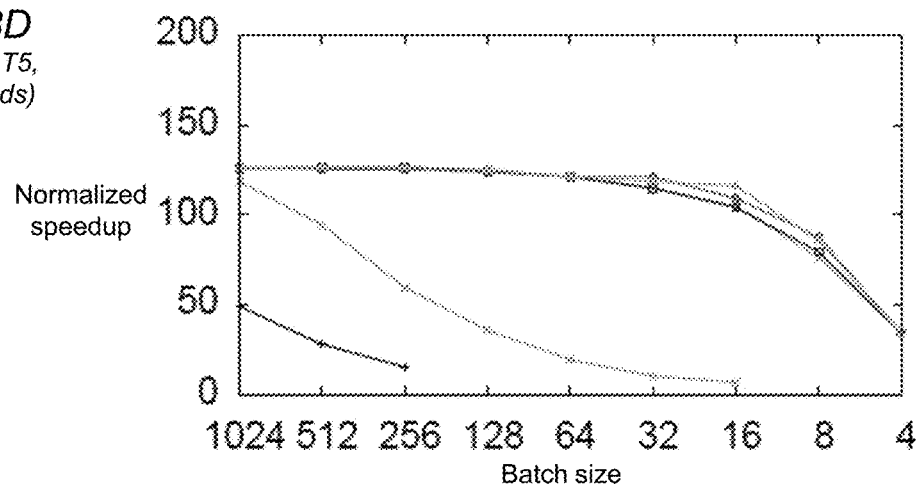
Figure 8E:
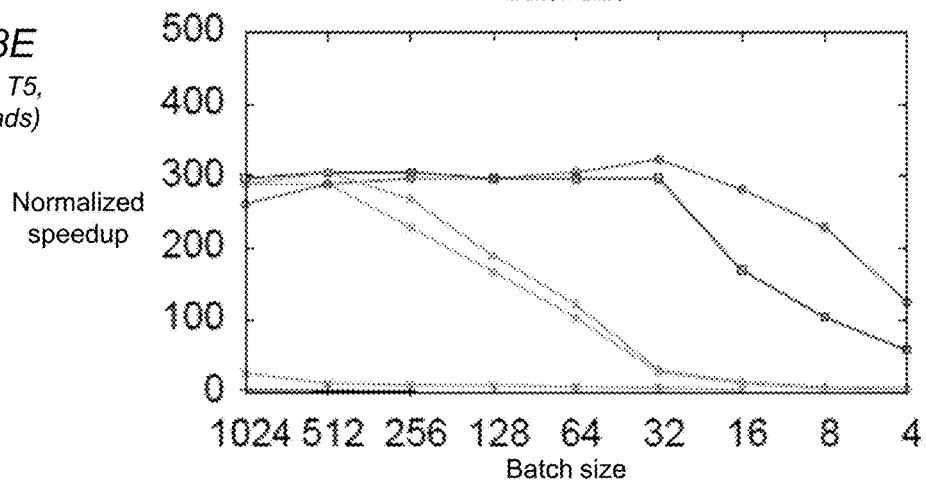
Figure 8F:
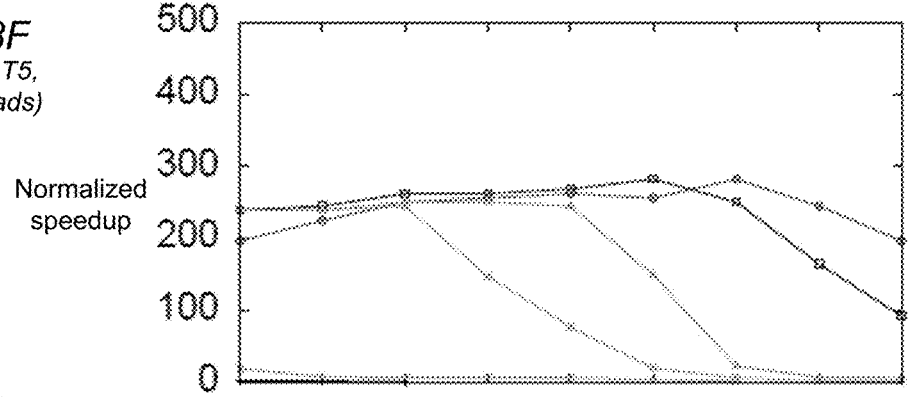
Figure 8G:
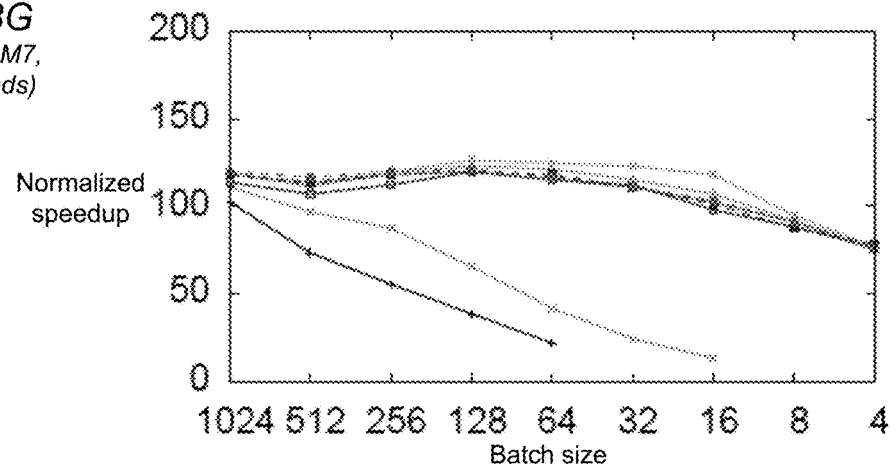
Figure 8H:
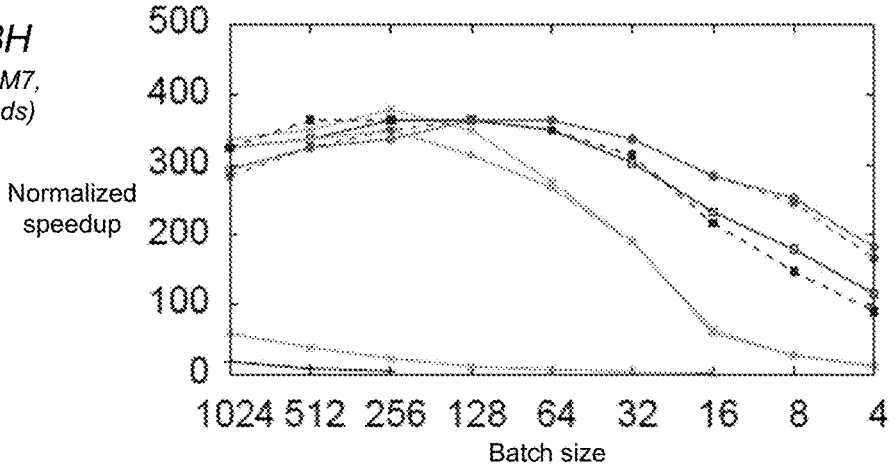
Figure 8I:
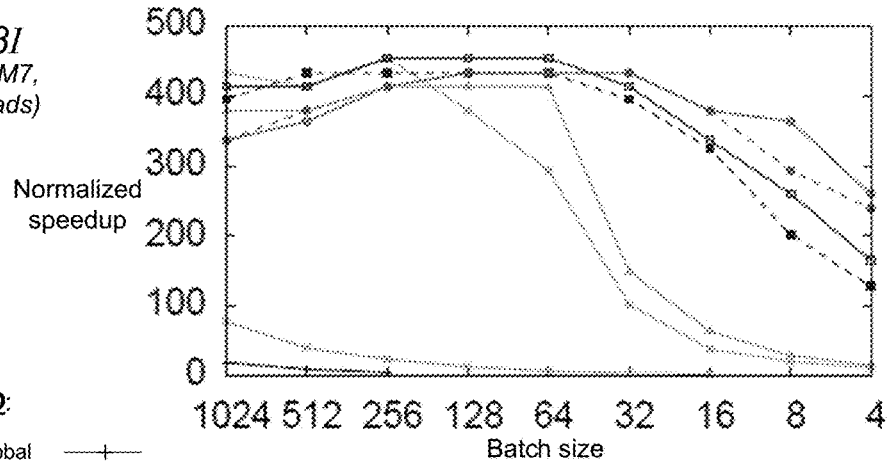

FIGS. 8A-8I graphically illustrate the results of the microbenchmark scalability experiments with a skewed work distribution on the same systems as shown in FIGS. 7A-7I. Results for the 2-socket Intel® 64 Xeon are shown in FIGS. 8A-8C, results for the Oracle® SPARC 8-socket T8 are shown in FIGS. 8D-8F, and results for the Oracle® SPARC 4-socket M7 (T7-4) are shown in FIGS. 8G-8I. For each system, FIGS. 8A-8I shows a low-contention workload with a modest number of threads (FIGS. 8A, 8D, and 8G), a workload with one thread per core (FIGS. 8B, 8E, and 8H), and a workload with all hardware contexts in use (FIGS. 8C, 8F, and 8I).

On the Intel 64 system (FIGS. 8A-8C), per-core and per-thread counters performed well. As with the even workload, with two threads per core there was little opportunity for combining within a core to improve performance.

On the SPARC systems (FIGS. 8D-8I), the use of combining had significant benefits at high thread counts (512 or 1024), with some additional benefit from asynchronous combining. The skewed workload results in CAS failures and re-execution when incrementing shared counters. In contrast, per-core combining allows most threads to request work by setting their request flag (which remains core-local in the L1$) and then waiting for work to be supplied (using mwait on the combiner lock on SPARC M7). Overall, the SPARC M7 performance at 1024 threads is almost unchanged between the skewed and even distributions.

Based on the microbenchmark results, per-thread counters were used as the default on Intel® 64, and per-core counters with asynchronous combining as the default on SPARC. Note that in various embodiments, threads may be assigned to counters following the structure of the machine, versus random assignment. i.e., the choice of counter may not be significant, and not just a reduction in contention via extra counters.

In addition to the results shown above, two-level combining (per-core and then per-socket) were also explored. Per-core combining with per-core counters performed better across all workloads, and so these other results were omitted for clarity.

Graph Algorithms

The next set of benchmarks evaluated graph analytics algorithms built over an embodiment of the runtime system. These experiments used PageRank and Triangle Counting as examples of algorithms with a single level of parallelism. The use of a Betweenness Centrality (BC) algorithm as an example with nested parallelism is also described below. In addition, the SNAP LiveJournal dataset (4.8 M vertices, 69 M edges) and the Twitter data set (42 M vertices, 1.5 B edges) were also used in these experiments. The graph algorithm experiments focused on the performance of the SPARC machines. As the microbenchmark results illustrated, the smaller 2-socket Intel® 64 system did not exhibit a great deal of sensitivity to work scheduling techniques with per-thread counters.

Figure 9A:
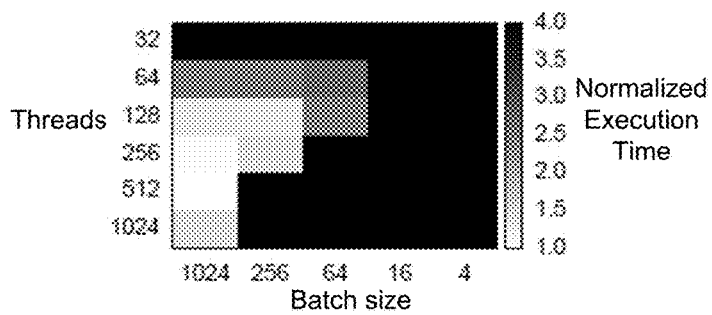
FIGS. 9A-9P graphically illustrate the performance of two SPARC machines on graph analytics computations on a LiveJournal input set, according to some embodiments.
Figure 9B:
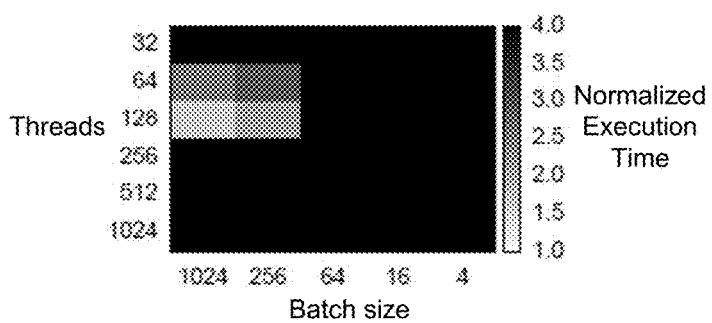
Figure 9C:
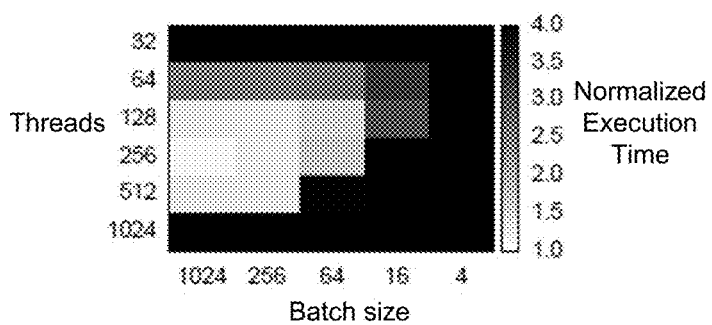
Figure 9D:
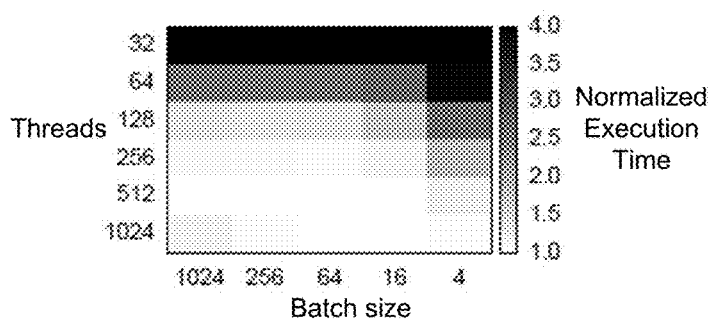
Figure 9E:
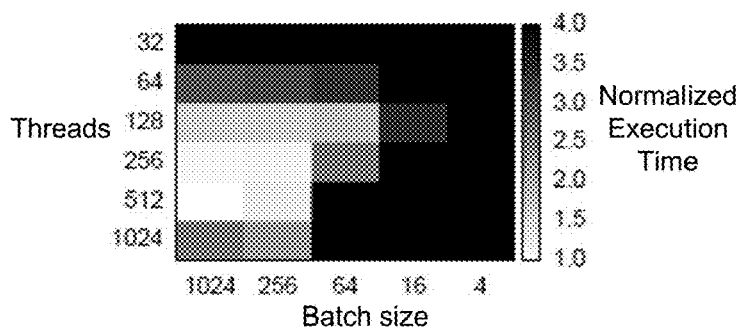
Figure 9F:
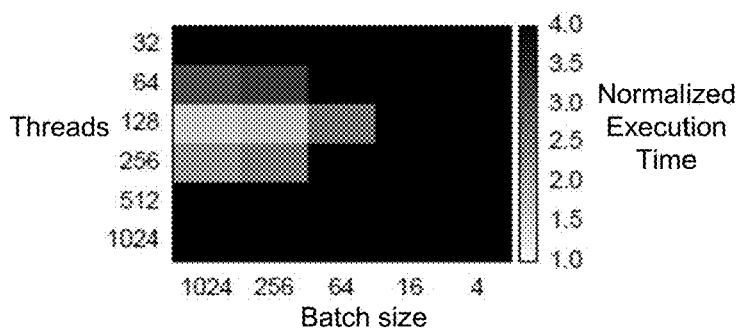
Figure 9G:
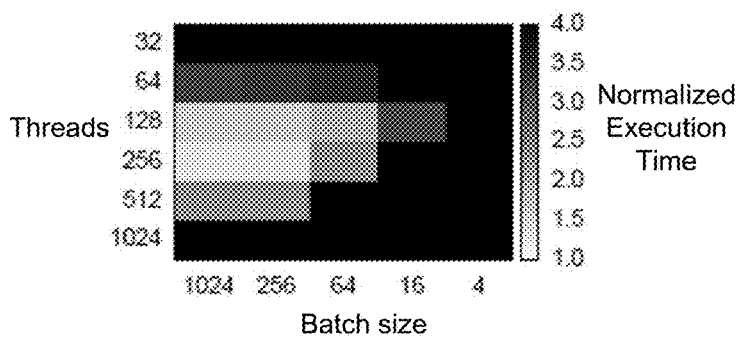
Figure 9H:
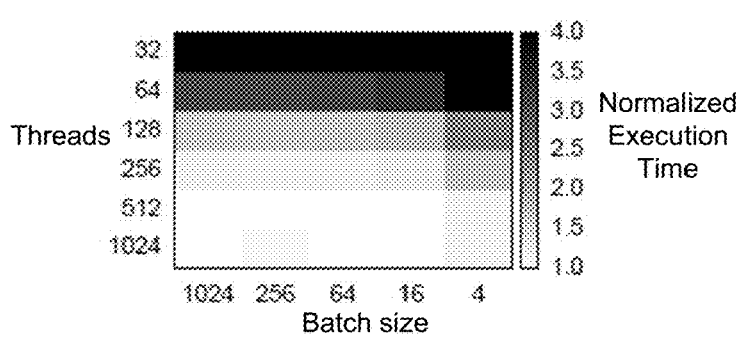
Figure 9I:
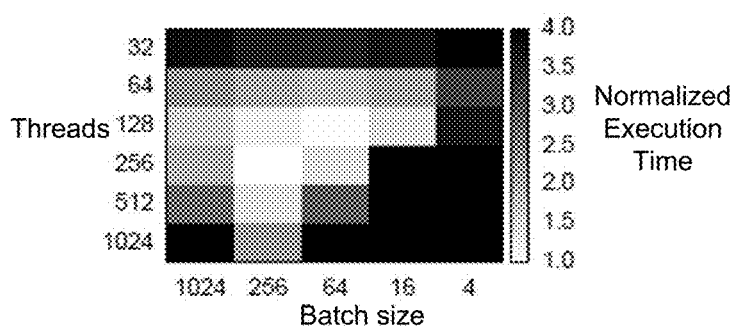
Figure 9J:
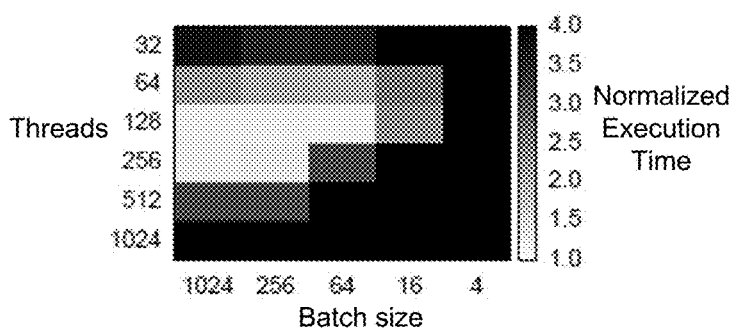
Figure 9K:
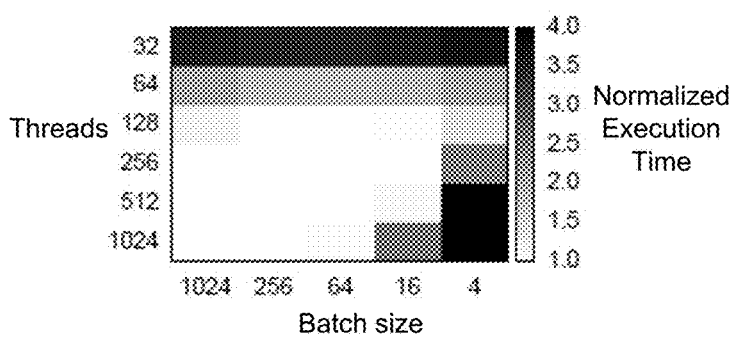
Figure 9L:
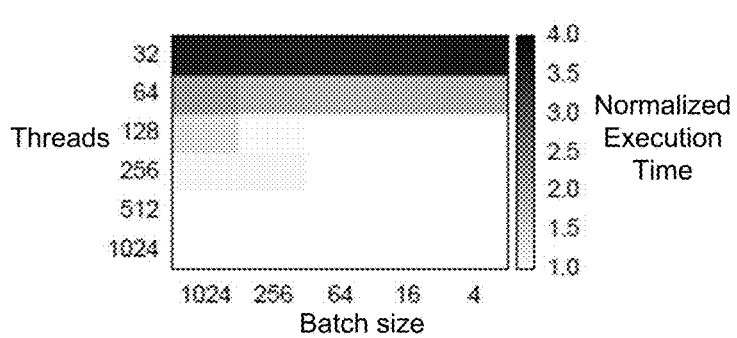
Figure 9M:
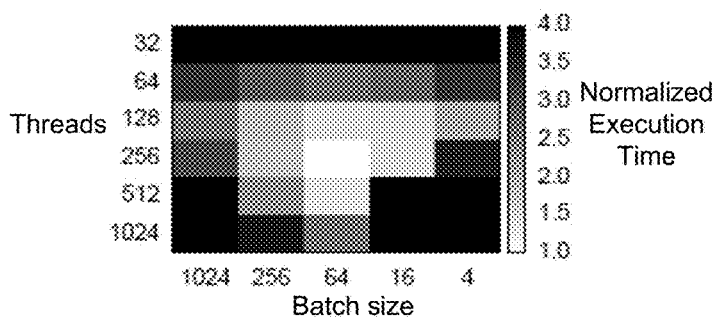
Figure 9N:
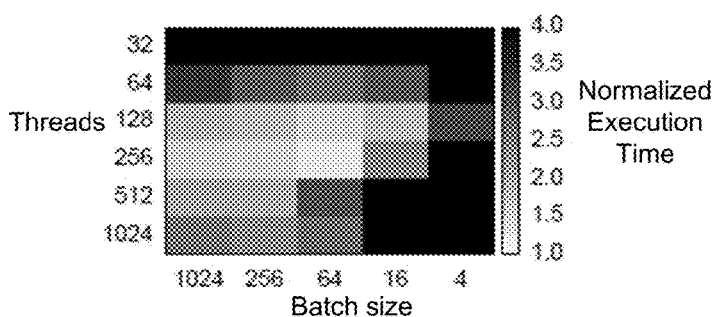
Figure 9O:
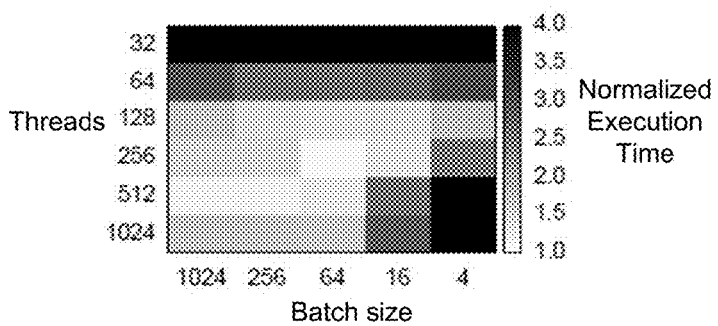
Figure 9P:
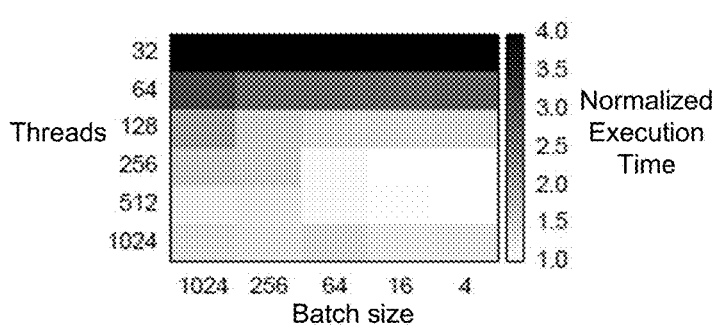
Figure 10A:
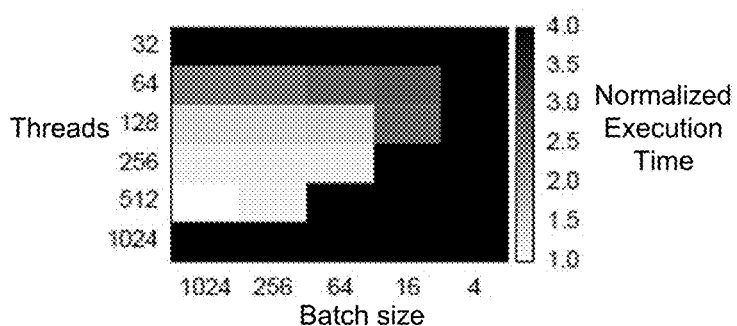
FIGS. 10A-10P graphically illustrate the performance of two SPARC machines on a larger Twitter input set, according to some embodiments.
Figure 10B:
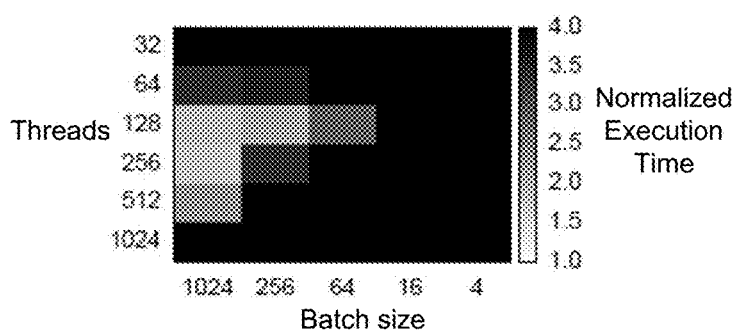
Figure 10C:
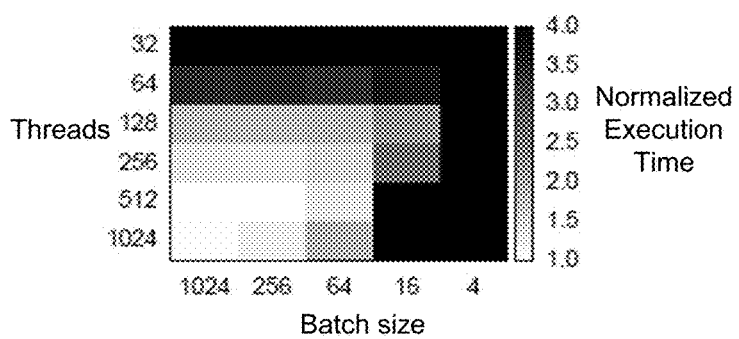
Figure 10D:
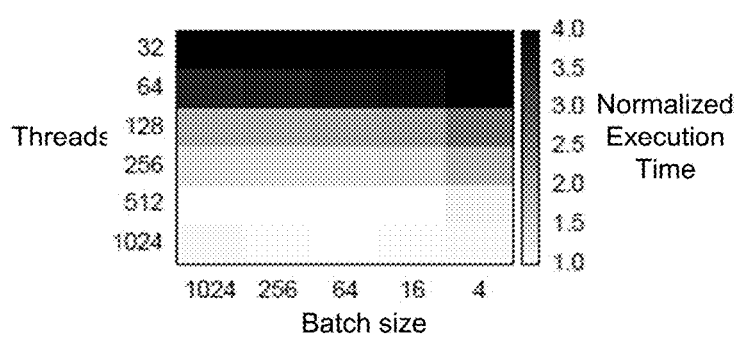
Figure 10E:
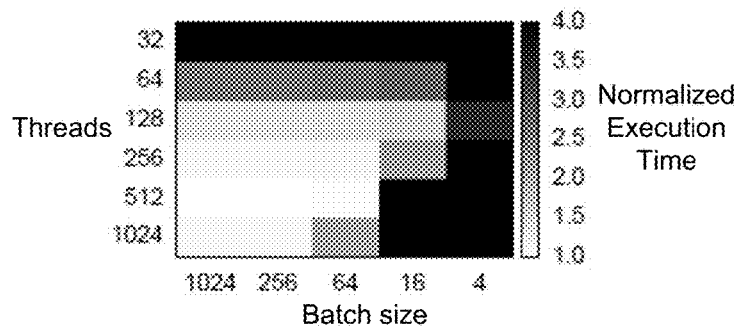
Figure 10F:
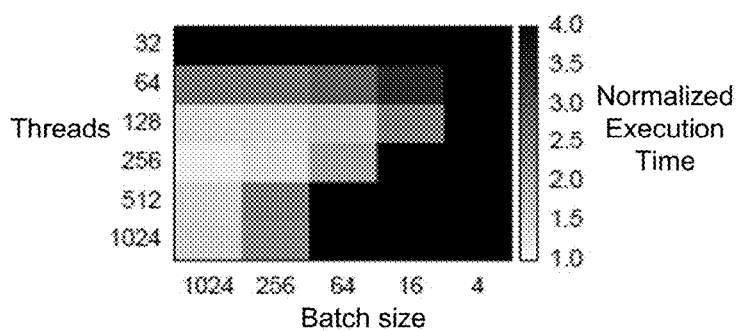
Figure 10G:
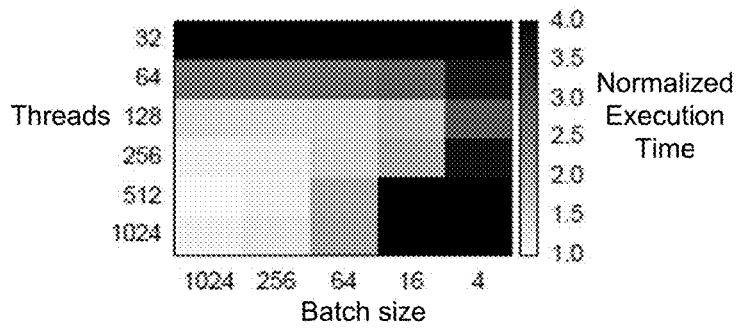
Figure 10H:
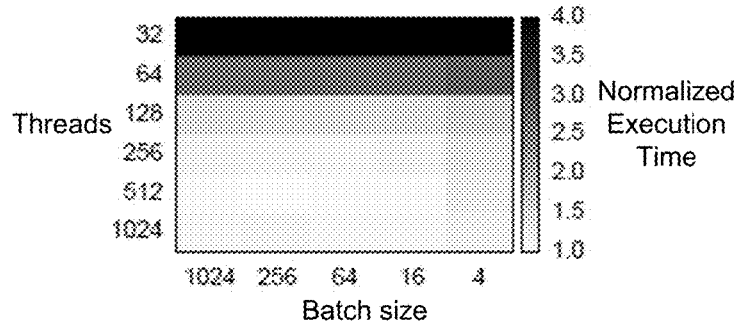
Figure 10I:
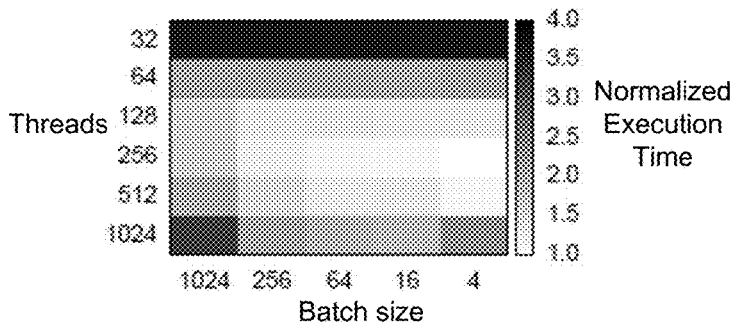
Figure 10J:
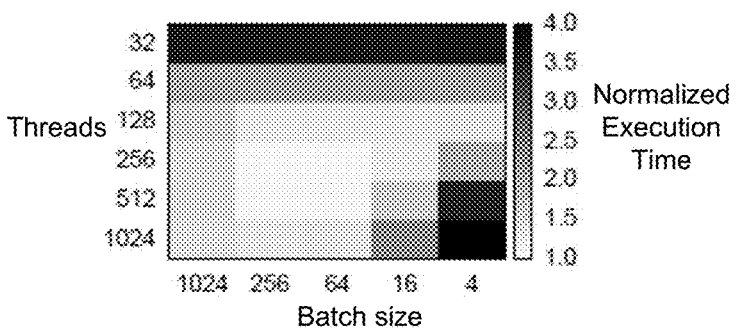
Figure 10K:
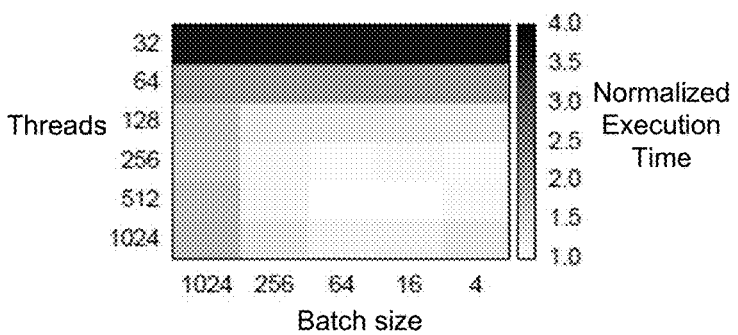
Figure 10L:
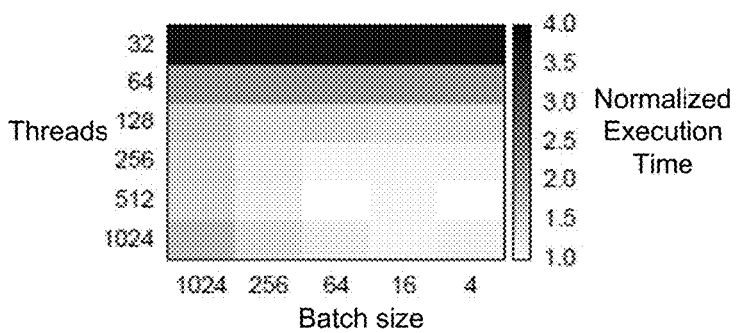
Figure 10M:
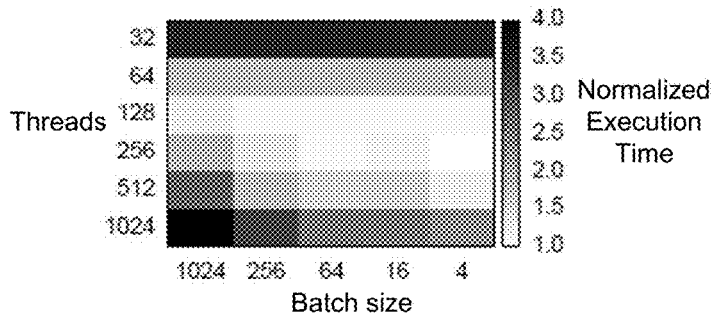
Figure 10N:
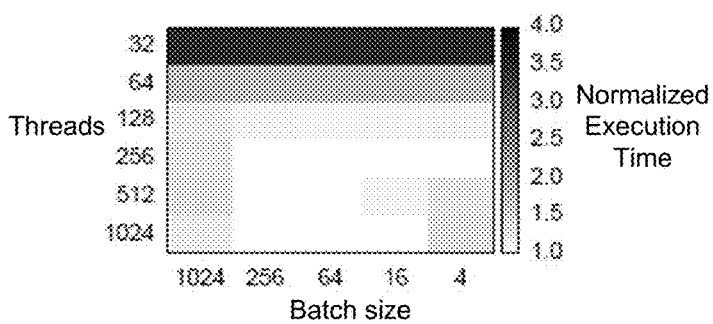
Figure 10O:
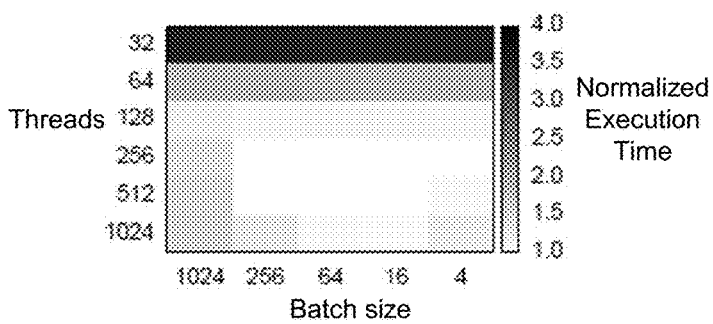
Figure 10P:
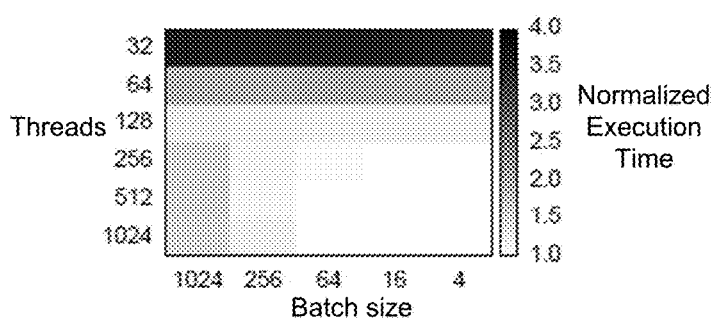

FIGS. 9A-9P graphically illustrate the performance of the two SPARC machines on the LiveJournal input (a small input set with 4.8 M vertices and 69 M edges). FIGS. 10A-10P graphically illustrate the performance of the two SPARC machines on the larger Twitter input (with 42 M vertices and 1.5 B edges). For each machine-algorithm combination, four work scheduling techniques are shown: the original OpenMP implementation (FIGS. 9A, 9E, 9I, 9M, 10A, 10E, 10I, and 10M), and then an embodiment of the runtime system using a single global counter (FIGS. 9B, 9F, 9J, 9N, 10B, 10F, 10J, and 10N), per-socket counters (FIGS. 9C, 9G, 9K, 9O, 10C, 10G, 10K, and 10O), and per-core counters with asynchronous combining (FIGS. 9D, 9H, 9L, 9P, 10D, 10H, 10L, and 10P). Each plot shows the performance of the given technique across thread counts (32 . . . 1024), and batch sizes (1024 . . . 4). Each square shows the execution time, normalized to the best performance achieved with OpenMP. With each plot, the time of the best configuration, normalized to the best OpenMP result on the same machine, is shown. Note that the dark rows at the top of the plots indicate there are insufficient threads to perform well on these scalable workloads, even with perfect work scheduling and no overheads.

On the LiveJournal input (FIGS. 9A-9P), careful tuning is needed to get good performance with OpenMP or with the runtime system using a single counter: different numbers of threads are best for the two algorithms, and there is a sharp fall-off in performance if the best configuration is not selected. The OpenMP implementations may perform better than the runtime system when using a single global counter. This is because the OpenMP implementations use static scheduling on some loops where work is known to be distributed evenly (e.g., copying from one array to another). Static scheduling may work well on such loops, but typically not on the main parts of the algorithm. Using a single global counter leads to poor performance at small batch sizes, and imbalance with large batches. Per-socket counters provide significant improvement at smaller batch sizes. As in the microbenchmark tests, per-core counters with asynchronous combining provide good performance over a wide range of configurations. Similar trends that are seen for the LiveJournal input (FIGS. 9A-9P) may be seen on the larger Twitter input as shown in FIGS. 10A-10P.

Comparison of the Runtime System with Galois

Embodiments of the runtime system described herein were also compared with a version of the Galois runtime system. The Galois system is a lightweight infrastructure for parallel in-memory processing that provides good performance and scalability across a range of graph benchmarks.

Figure 11A:
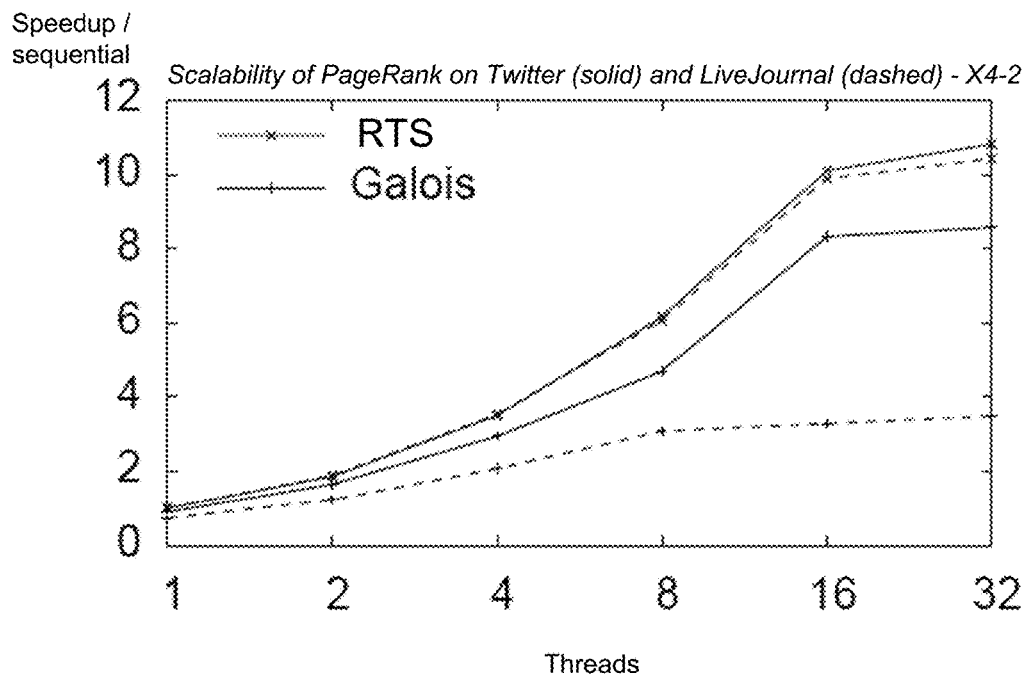
FIGS. 11A and 11B illustrate the results of scalability of PageRank on Twitter and LiveJournal input sets, according to some embodiments.
Figure 11B:
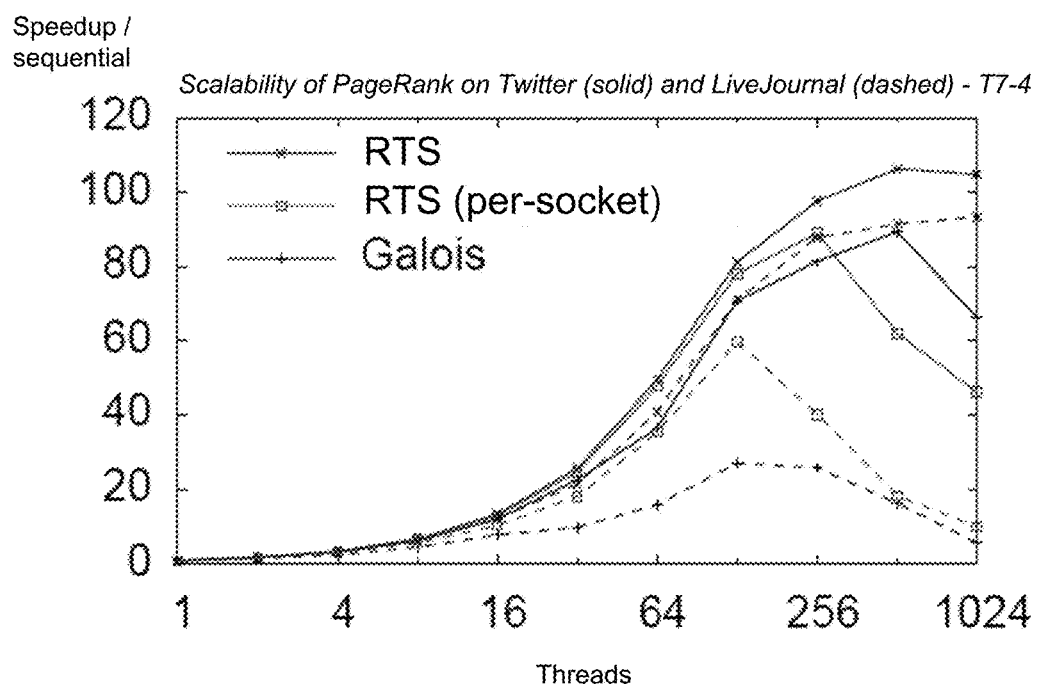

FIGS. 11A and 11B compare the performance of Galois to the runtime system (RTS) on the Intel® X4-2 and Oracle® SPARC T7-4 systems. Solid lines are for the Twitter input data set, and dashed lines are for LiveJournal input. All results are normalized to the single-threaded implementation without concurrency control. As can be seen in FIGS. 11A and 11B, the runtime system (RTS) performs better on both machines and both inputs.

Referring to FIG. 11A, on the Intel X4-2 system, RTS scales similarly on both graphs up to 16 threads (1 thread per core), with a slight additional benefit from hyperthreading. Galois scales well on the larger Twitter graph, with 15-20% overhead compared with RTS. Galois does not scale well on the LiveJournal graph with shorter loop iterations. Both differences may be due to the way Galois distributes work using chunks of iterations. In Galois, each chunk is reified in memory as a block listing the iterations to execute, with each thread holding a current working block, and per-socket queues of blocks are used to balance work. On the smaller graph, the iterations are short-running and contention on the per-socket queues appears to limit scaling. On the Twitter graph, each iteration is longer and contention is less significant. However, the inner loop of fetching an iteration and executing it remains slower than with RTS.

Referring to FIG. 11B, similar trends are seen on the SPARC T7-4. Galois and RTS both scale well to 128 threads (1 per core), as does the additional RTS variant using per-socket iteration counters. Beyond this point, RTS continues to scale well with asynchronous work distribution, whereas the other implementations are harmed by contention between threads when distributing work. On both graphs, RTS continues to scale to the complete machine of 1024 threads.

Compared with the original OpenMP implementation, using per-core counters with asynchronous combining in RTS improves the best-case performance in all four of the smaller workloads by 5%, 8%, 17%, and 39%. In the larger workloads it improves performance in three of the four cases (8%, 8%, and 10%), and reduces performance in only one case, by 4%. In addition, and perhaps more significantly, the performance achieved is more stable over different thread and batch settings, and does not require the programmer to select between static and dynamic scheduling.

Nested Parallelism

Figure 12A:
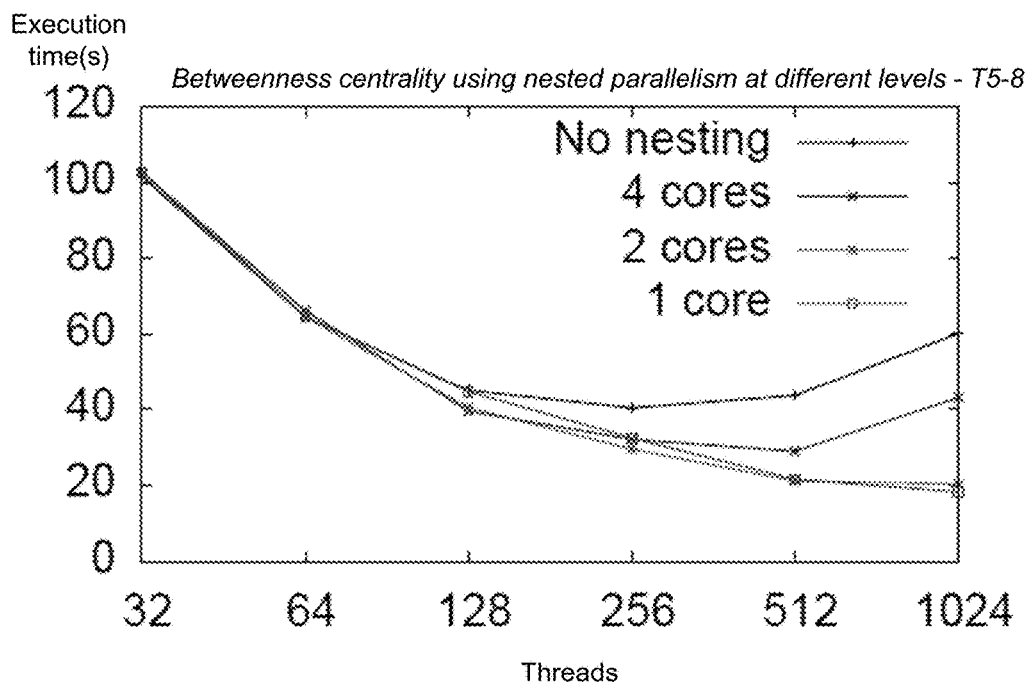
FIGS. 12A and 12B illustrate the results of the Betweenness Centrality experiments using nested parallelism for two cases, according to some embodiments.
Figure 12B:
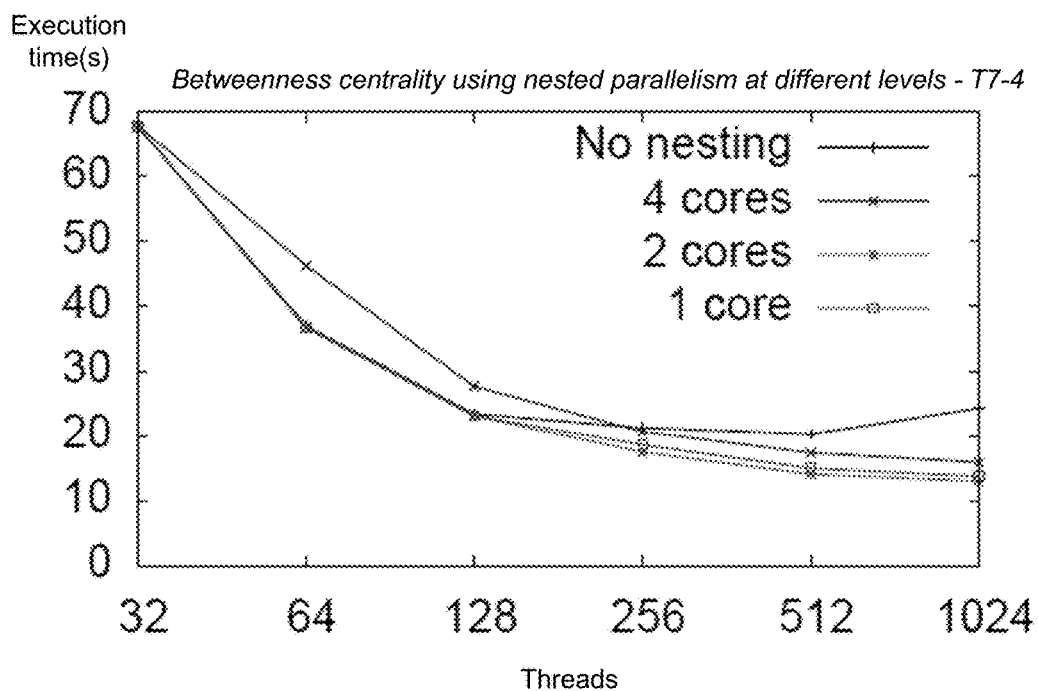

Experiments were also performed that used nested parallelism as part of an algorithm to compute Betweenness Centrality. For each vertex, the computation executes breadth-first-search (BFS) traversals. The metric was computed for every vertex in a graph (rather than sampling a subset of vertices), and so the execution time can be large even for a modestly sized graph. In these experiments, the SNAP Slashdot data set (with 82.1 K vertices and 948 K edges) was used. FIGS. 12A and 12B compare flat parallelism (in which each vertex is processed sequentially), versus nested parallelism at different levels. A parallel BFS algorithm with 13 different parallel loops was used.

FIGS. 12A and 12B illustrate the results of the Betweenness Centrality experiments using nested parallelism for two cases: SPARC T5-8 (FIG. 12A), and SPARC T7-4 (FIG. 12B). These experiments compared flat parallelism (in which one vertex was processed sequentially in each thread), versus nested parallelism at different levels (in which a parallel breadth-first search (BFS) algorithm within sets of threads was used). On each machine, flat parallelism scaled well to the level of one thread per core (128 threads on the two SPARC systems that were used). On the T5-8 (FIG. 12A), the best performance was obtained using nesting within a single core. On the T7-4 (FIG. 12B), the best performance was obtained using nesting within pairs of cores. In both cases, this corresponds to the level of the L2-D$. In addition to the results shown here, other experiments tried (i) using nested parallelism at a per-socket level, and (ii) using parallelism only at the inner level in the BFS algorithm. Both of these alternatives were substantially worse than flat parallelism.

Values from the SPARC CPU performance counters were recorded. With one thread per core, 9:8% of load instructions miss in the L2-D$. With flat parallelism, this rises steadily to 29% with 8 threads per core. With nested parallelism, the miss rate rises only slightly to 10:8%.

As shown in FIG. 12B, on the T7-4 system, in addition to the change in cache behavior, using mwait rather than spinning in the runtime system improved the best performance that was achieved by 8%. In both cases, the best performance was achieved using nesting within a L2-D$. However, with mwait, performance continues to scale to 1024 threads, while with spinning there was a performance degradation going to 1024 threads. This reflects the fact that using mwait avoids a waiting thread contending with active threads. This interacts well with the non-work-conserving use of threads, and the sequential per-core work between the nested parallel sections; it may be the case that these intervals would be too short to suspend the thread in the OS.

As described herein, in some embodiments, the runtime system implements runtime system techniques for supporting parallel loops with fine-grain work scheduling. By using distributed per-core counters, along with request-combining between threads within a core, it has been shown that it may be possible to scale down to batches of work of around 1000 cycles on machines with 1024 hardware contexts. In addition, on an example workload with nested parallelism, it has been shown that it may be possible to obtain further scaling by matching the point at which a switch to the inner level parallelism occurs to the position of the level 2 data cache (L2-D$) in the machine, which lets multiple threads execute the inner loops while sharing data in their common cache.

At least some of the various techniques used in embodiment of the runtime system as described herein may be applied to other parallel programming models. For example, the combining techniques could be applied transparently in implementations of OpenMP dynamically scheduled loops, either with, or without, asynchronous combining.

In addition, at least some of the various techniques used in embodiment of the runtime system as described herein may be applied to work-stealing systems. For example, it may be beneficial to use per-core queues, and for threads within a core to use combining to request multiple items at once, in a work-stealing system. As with loop scheduling in the runtime system, this may reduce the number of atomic operations that are needed, and may enable asynchrony between requesting work and receiving it. Furthermore, using per-core queues with combining may make loop termination tests more efficient than with per-thread queues (typical termination tests must examine each queue at least once before deciding that all of the work is complete).

There is a trend toward increasingly non-uniform memory performance, making it important to exercise control over how nesting maps to hardware. In at least some embodiments of the runtime system as described herein, this may be done by explicit programmer control and/or non-work-conserving allocation of work to threads. However, other techniques may be used to map nesting to hardware in embodiments, for example feedback-directed techniques, or static analysis techniques.

Example Computing System

Figure 13:
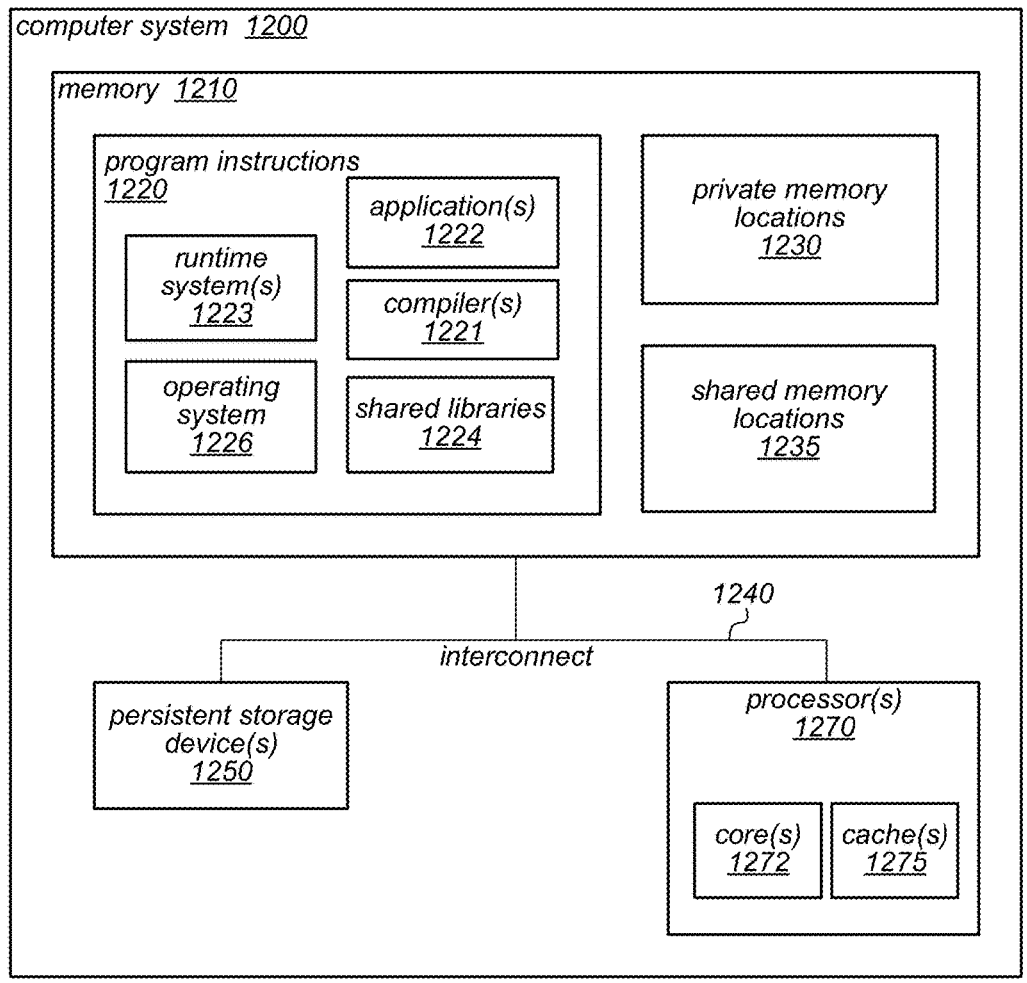
FIG. 13 is a block diagram illustrating one embodiment of a computing system that is configured to implement and/or support embodiments of the runtime system as described herein.

FIG. 13 illustrates a computing system configured to implement some or all of the methods described herein, according to at least some embodiments. The computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing the techniques described herein (including dynamic co-scheduling of hardware contexts for runtime systems and/or fine-grained scheduling of parallel loops) may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1270; each processor 1270 may include multiple cores 1272, any of which may be single or multi-threaded. For example, multiple processor cores 1272 may be included in a single processor chip (e.g., a single processor 1270), and multiple processor chips may be included on a CPU board, one or more of which may be included in computer system 1200. In addition, each processor 1270 (or core thereof) may include one or more active thread counters, such as those described above in reference to FIGS. 3A-3C, and one or more combiners, such as those described above in reference to FIGS. 3A-3C. Each of the processors 1270 may include a hierarchy of caches 1275, in various embodiments. For example, each processor chip may include multiple L1 caches 1275 (e.g., one per processor core 1272) and one or more other caches 1275 (which may be shared by the processor cores 1272 on the processor chip). Each processor 1270 may also include one or more other resources that are shared between two or more cores 1272 (e.g., a floating point divide unit or a specialized accelerator for encryption or compression), in some embodiments. The computer system 1200 may also include one or more persistent storage devices 1250 (e.g. optical storage, magnetic storage, hard drive, tape drive, solid state memory, etc.) and one or more system memories 1210 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 13 (e.g., video cards, audio cards, additional network interfaces, peripheral devices, a network interface such as an ATM interface, an Ethernet interface, a Frame Relay interface, etc.)

The one or more processors 1270, the storage device(s) 1250, and the system memory 1210 may be coupled to the system interconnect 1240. One or more of the system memories 1210 may contain program instructions 1220. Program instructions 1220 may be executable to implement one or more compilers 1221, one or more applications 1222 (which may include parallel computations suitable for execution on multiple hardware contexts, as described herein), one or more runtime systems 1223 (which may include resource-management-enabled runtime systems), shared libraries 1224, and/or operating systems 1226. In some embodiment, program instructions 1220 may be executable to implement a contention manager (not shown). Program instructions 1220 may be encoded in platform native binary, any interpreted language such as Java™ byte-code, or in any other language such as C/C++, Java™, etc. or in any combination thereof. The program instructions 1220 may include functions, operations and/or other processes for implementing dynamic co-scheduling of hardware contexts for runtime systems and/or fine-grained scheduling of parallel loops, as described herein. Such support and functions may exist in one or more of the shared libraries 1224, operating systems 1226, or applications 1222, in various embodiments. For example, in some embodiments, the resource management components described herein may be implemented as user-mode shared libraries that link with resource-management-enabled versions of different runtime systems to perform dynamic co-scheduling of hardware contexts and/or fine-grained scheduling of parallel loops for those runtime systems.

The system memory 1210 may further comprise private memory locations 1230 and/or shared memory locations 1235 where data may be stored. For example, shared memory locations 1235 may store various tables in which local or aggregated performance counter data or performance metrics, resource demands, and/or resource allocations are recorded on a per-application or per-hardware-context basis, active thread counts, and/or other data accessible to concurrently executing threads, processes, or transactions, in various embodiments. In addition, the system memory 1210 and/or any of the caches of processor(s) 1270 may, at various times, store delay parameter values, hysteresis parameter values, periodic check-in parameter values, spinning limit values, lists or queues of work items or work tickets, values of condition variables or synchronization variables, lists or queues of predicates, latch structures, state information for latches, state information for jobs, work items or work tickets, priority information for jobs and/or hardware contexts, identifiers of jobs, software threads and/or hardware contexts, various counters or flags, threshold values, policy parameter values, maximum count values, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of runtime systems, resource management components, structures, and scheduling policies, it should be noted that the techniques and mechanisms disclosed herein for implementing dynamic co-scheduling of hardware contexts for runtime systems and/or fine-grained scheduling of parallel loops may be applicable in other contexts in which the types of runtime systems, resource management components, structures, and scheduling policies are different than those described in the examples herein. It is intended that the following claims be interpreted to embrace all such variations and modifications.

What is claimed:

1. A method, comprising:
   performing, by a computer that includes at least one processor including multiple hardware contexts:
      beginning execution of an application that is configured for execution on the computer and that includes a loop construct, wherein beginning execution comprises instantiating a plurality of threads of the application, wherein one of the threads is designated as a root thread, and wherein the other threads are designated to perform work in the loop construct;
      beginning, by the root thread, execution of work in the application, wherein the other threads remain idle;
      encountering, by the root thread, the loop construct while executing work in the application; and
      upon the root thread encountering the loop construct while executing work in the application;
         obtaining an allocation of loop iterations for execution of work in the loop construct;
         assigning respective portions of the allocation of loop iterations to two or more of the threads; and
         beginning, by the two or more of the threads, execution of the work in the loop construct.

2. The method as recited in claim 1, wherein the loop construct is an outer loop construct that includes an inner loop construct nested within the outer loop construct.

3. The method as recited in claim 2, wherein the root thread encountering the loop construct comprises the root thread encountering the outer loop construct; and
wherein beginning, by two or more of the threads, execution of work in the loop construct comprises the two or more threads beginning execution of work in the outer loop construct.

4. The method as recited in claim 3, wherein the two or more threads each execute on a different one of the hardware contexts.

5. The method as recited in claim 3, further comprising:
upon one of the two or more threads encountering the inner loop construct while executing work in the outer loop construct, beginning, by the thread and at least one other thread, execution of work in the inner loop construct.

6. The method as recited in claim 5, wherein the thread and the at least one other thread execute on the same hardware context.

7. The method as recited in claim 2, wherein the root thread encountering the loop construct comprises the root thread encountering the inner loop construct; and
wherein beginning, by two or more of the threads, execution of work in the loop construct comprises the two or more threads beginning execution of work in the inner loop construct.

8. The method as recited in claim 1, wherein the two or more threads include the root thread.

9. The method as recited in claim 1, wherein the obtaining of the allocation of loop iterations and the assigning of respective portions of the allocation comprise:
generating, by the two or more threads, a plurality of work requests for the loop construct; and
combining, by the root thread, the plurality of work requests into an aggregate work request.

10. A system, comprising:
a plurality of processor cores; and
a memory coupled to the processor cores and storing program instructions that when executed on the processor cores cause the processor cores to implement:
an application configured for execution on the system, wherein the application includes instantiating a plurality of threads, wherein one of the plurality of threads is designated as a leader thread for two or more of the other threads that are designated as follower threads of the leader thread;
wherein the lead thread is configured to:
begin execution of work in the application on one of the processor cores, wherein the follower threads remain idle;
encounter a loop construct while executing work in the application; and
upon encountering the loop construct:
determine a number of loop iteration for execution of work in the loop construct;
assign the loop iterations to respective one or more of the follower threads; and
cause the one or more of the follower threads to begin execution of the work in the loop construct.

11. The system as recited in claim 10, wherein the loop construct is an outer loop construct that includes an inner loop construct nested within the outer loop construct.

12. The system as recited in claim 11, wherein at least one of the one or more follower threads executes on a different processor core than the leader thread.

13. The system as recited in claim 11, wherein a follower thread is configured to, upon encountering the inner loop construct while executing work in the outer loop construct, cause at least one other thread to begin execution of work in the inner loop construct.

14. The system as recited in claim 13, wherein the follower thread is further configured to, upon encountering the inner loop construct, begin execution of work in the inner loop construct.

15. The system as recited in claim 13, wherein the follower thread and the at least one other thread execute on the same processor core.

16. The system as recited in claim 10, wherein the loop construct is an inner loop construct nested within an outer loop construct.

17. The system as recited in claim 10, wherein the leader thread is further configured to, upon encountering the loop construct, begin execution of work in the loop construct.

18. A non-transitory, computer-readable storage medium storing program instructions that when executed on a multicore computer cause the multicore computer to perform:
beginning execution of an application that is configured for execution on the multicore computer, wherein beginning execution comprises:
instantiating a plurality of threads of the application;
designating one of the plurality of threads as a leader thread for two or more of the other threads; and
designated the two or more other threads as follower threads of the leader thread;
beginning execution of work in the application by the leader thread, wherein the follower threads remain idle;
upon the leader thread encountering a loop construct while executing work in the application:
determining a number of loop iterations for execution of work in the loop construct;
assigning the loop iterations to respective one or more of the follower threads; and
causing the one or more of the follower threads to begin execution of the work in the loop construct.

19. The non-transitory, computer-readable storage medium as recited in claim 18, wherein the loop construct is an outer loop construct that includes an inner loop construct nested within the outer loop construct, and wherein each follower thread is configured to, upon encountering the inner loop construct while executing work in the outer loop construct, cause at least one other thread to begin execution of work in the inner loop construct.

20. The non-transitory, computer-readable storage medium as recited in claim 18, wherein the loop construct is an inner loop construct nested within an outer loop construct.

* * * * *